US008628055B2

(12) United States Patent
Shannon et al.

(10) Patent No.: US 8,628,055 B2
(45) Date of Patent: Jan. 14, 2014

(54) BI-DIRECTION RAPID ACTION ELECTROSTATICALLY ACTUATED MICROVALVE

(75) Inventors: Mark A. Shannon, Champaign, IL (US); Byunghoon Bae, Savoy, IL (US); Richard I. Masel, Champaign, IL (US)

(73) Assignee: The Board of Trustees of the University of Illinois, Urbana, IL (US)

( * ) Notice: Subject to any disclaimer, the term of this patent is extended or adjusted under 35 U.S.C. 154(b) by 1628 days.

(21) Appl. No.: 11/797,197

(22) Filed: May 1, 2007

(65) Prior Publication Data

US 2008/0149869 A1 Jun. 26, 2008

Related U.S. Application Data

(63) Continuation-in-part of application No. 11/493,376, filed on Jul. 26, 2006, now abandoned.

(60) Provisional application No. 60/702,972, filed on Jul. 27, 2005.

(51) Int. Cl.
*F16K 31/02* (2006.01)

(52) U.S. Cl.
USPC ............... 251/129.01; 251/331; 251/368

(58) Field of Classification Search
USPC ..................... 251/129.01, 331, 368
See application file for complete search history.

(56) References Cited

U.S. PATENT DOCUMENTS

| | | | |
|---|---|---|---|
| 2,901,623 A | 8/1959 | Wouters | |
| 3,149,941 A | 9/1964 | Barnitz et al. | |
| 3,461,519 A * | 8/1969 | Raschle | 432/266 |
| 3,538,744 A | 11/1970 | Karasek | |
| 4,293,415 A | 10/1981 | Bente et al. | |
| 4,376,641 A | 3/1983 | Nestrick et al. | |
| 4,498,850 A * | 2/1985 | Perlov et al. | 417/322 |
| 4,509,964 A | 4/1985 | Hubball et al. | |
| 4,585,209 A | 4/1986 | Aine et al. | |
| 4,628,576 A | 12/1986 | Giachino et al. | |
| 4,647,013 A | 3/1987 | Giachino et al. | |
| 4,821,999 A | 4/1989 | Ohtaka | |
| 4,826,131 A | 5/1989 | Mikkor | |

(Continued)

OTHER PUBLICATIONS

Bae, B. et al., A touch-mode capacitance microvalve equipped with high speed and pressure microsecond switching performance, MEMS 766-769 (2006)

(Continued)

*Primary Examiner* — John Bastianelli
(74) *Attorney, Agent, or Firm* — Kilpatrick Townsend & Stockton LLP

(57) ABSTRACT

A bi-directional electrostatic microvalve includes a membrane electrode that is controlled by application of voltage to fixed electrodes disposed on either side of the membrane electrode. Dielectric insulating layers separate the electrodes. One of the fixed electrodes defines a microcavity. Microfluidic channels formed into the electrodes provide fluid to the microcavity. A central pad defined in the microcavity places a portion of the second electrode close to the membrane electrode to provide a quick actuation while the microcavity reduces film squeezing pressure of the membrane electrode. In preferred embodiment microvalves, low surface energy and low surface charge trapping coatings, such as fluorocarbon films made from cross-linked carbon di-fluoride monomers or surface monolayers made from fluorocarbon terminated silanol compounds coatings coat the electrode low bulk charge trapping dielectric layers limit charge trapping and other problems and increase device lifetime operation.

44 Claims, 22 Drawing Sheets

(56) References Cited

U.S. PATENT DOCUMENTS

| | | | |
|---|---|---|---|
| 4,865,746 A | | 9/1989 | Overfield |
| 4,885,830 A | | 12/1989 | Ohtaka |
| 5,055,346 A | * | 10/1991 | Rohrbacher ............... 428/216 |
| 5,069,419 A | * | 12/1991 | Jerman ...................... 251/11 |
| 5,082,242 A | | 1/1992 | Bonne et al. |
| 5,176,358 A | | 1/1993 | Bonne et al. |
| 5,180,623 A | | 1/1993 | Ohnstein |
| 5,216,273 A | | 6/1993 | Doering et al. |
| 5,322,258 A | * | 6/1994 | Bosch et al. ............... 251/65 |
| 5,323,999 A | | 6/1994 | Bonne et al. |
| 5,417,235 A | | 5/1995 | Wise et al. |
| 5,441,597 A | | 8/1995 | Bonne et al. |
| 5,619,177 A | | 4/1997 | Johnson et al. |
| 5,836,750 A | | 11/1998 | Cabuz |
| 5,899,218 A | | 5/1999 | Dugan |
| 5,941,501 A | | 8/1999 | Biegelsen et al. |
| 6,000,676 A | | 12/1999 | Zengerle et al. |
| 6,026,834 A | * | 2/2000 | Azima ........................ 137/1 |
| 6,098,661 A | | 8/2000 | Yim et al. |
| 6,126,140 A | | 10/2000 | Johnson et al. |
| 6,129,331 A | | 10/2000 | Henning et al. |
| 6,182,941 B1 | * | 2/2001 | Scheurenbrand et al. ................ 251/129.04 |
| 6,215,221 B1 | | 4/2001 | Cabuz et al. |
| 6,454,840 B1 | | 9/2002 | Gellert et al. |
| 6,470,904 B1 | | 10/2002 | Tai et al. |
| 6,557,820 B2 | | 5/2003 | Wetzel et al. |
| 6,568,286 B1 | * | 5/2003 | Cabuz ........................ 73/863.33 |
| 6,607,580 B1 | | 8/2003 | Hastings et al. |
| 6,626,416 B2 | | 9/2003 | Sharma et al. |
| 6,626,417 B2 | | 9/2003 | Winger et al. |
| 6,670,024 B1 | | 12/2003 | Yu |
| 6,759,013 B2 | | 7/2004 | Kaltenbach et al. |
| 6,783,680 B2 | | 8/2004 | Malik |
| 6,793,753 B2 | | 9/2004 | Unger et al. |
| 6,830,229 B2 | | 12/2004 | Wetzel et al. |
| 6,834,671 B2 | | 12/2004 | Cotte et al. |
| 6,837,476 B2 | | 1/2005 | Cabuz et al. |
| 6,968,862 B2 | | 11/2005 | Cabuz et al. |
| 6,986,365 B2 | | 1/2006 | Henning et al. |
| 6,986,500 B2 | | 1/2006 | Giousouf et al. |
| 6,998,040 B2 | | 2/2006 | Malik et al. |
| 7,014,165 B2 | | 3/2006 | Ji et al. |
| 2003/0234376 A1 | * | 12/2003 | Cabuz et al. ............. 251/129.01 |
| 2004/0000843 A1 | * | 1/2004 | East ........................ 310/331 |
| 2004/0137300 A1 | * | 7/2004 | Gemmen et al. ......... 251/129.01 |
| 2006/0071192 A1 | * | 4/2006 | Ohmi et al. ............... 251/331 |
| 2006/0113231 A1 | | 6/2006 | Malik |
| 2006/0144237 A1 | | 7/2006 | Liang et al. |
| 2006/0175238 A1 | | 8/2006 | Lautamo |
| 2007/0172960 A1 | | 7/2007 | Malik et al. |
| 2010/0132547 A1 | | 6/2010 | Masel et al. |

OTHER PUBLICATIONS

Bochobza-Degani, O. et al., On the effect of residual charges on the pull-in parameters of electrostatic actuators, Sensors and Actuators A 97-98:563-568 (2002).

Bosch, D. et al., A silicon microvalve with combined electromagnetic/electrostatic actuation, Sensors and Actuators 37-38:684-692 (1993).

Castañer, L. M. et al., Pull-in time—energy product of electrostatic actuators: comparison of experiments with simulation, Sensors and Actuators, 83:263-269 (2000).

Legtenberg, R. et al., Electrostatic Curved Electrode Actuators, Journal of Microelectromechanical Systems 6(3):257-265 (1997).

Messner, S. et al., 3-way silicon microvalve for pneumatic applications with electrostatus actuation principle, Microfluid Nanofluid 89-96 (2006).

Messner, S. et al., Electrostatic driven 3-way silicon microvalve for pneumatic applications, IEEE 88-91 (2003).

Oberhammer, J. et al., Design and fabrication aspects of an S-shaped film actuator based DC to RF MEMS switch, Journal of Microelectromechanical Systems 13(3):421-428 (2004).

Ohnstein, T. et al., Micromachined silicone microvalve, Proc. IEEE Micro Electro Mechanical Systems, An Investigation of Micro Structures, Sensors, Actuators, Machines and Robots, Napa Valley, CA 95-98 (1990).

Philpott, M. L. et al., Switchable electrostatic micro-valves with high hold-off pressure, Technical Digest of the 2000 Solid-State Sensor and Actuator Workshop, 226-229.

Sato, K. et al., An electrostatically actuated gas valve with an S-shaped film element, J. Micromech. Microeng. 4:205-209 (1994).

Schaible, J. et al., Electrostatic microvalves in silicon with 2-way-function for industrial applications, The $11^{th}$ International Conference on Solid-State Sensors and Actuators, Munich, Germany 928-931 (2001).

Shikida, M. et al., Characteristics of an electrostatically-driven gas valve under high-pressure conditions, Center for Materials Processing Technology 235-240 (1994).

Shikida, M. et al., Electrostatically driven gas valve with high conductance, Journal of Microelectromechanical Systems, 3(2):76-80 (1994).

Shikida, M. et al., Fabrication of an S-shaped microactuator, Journal of Microelectromechanical Systems, 6(1):18-24 (1997).

Shikida, M. et al., Micromachined S-shaped actuator, Sixth International Symposium on Micro Machine and Human Science 167-172 (1995).

Shikida, M. et al., Response time measurement of electrostatic S-shaped film actuator related to environmental gas pressure conditions, IEEE 210-215 (1996).

Vandelli, N. et al., Development of a MEMS microvalve array for fluid flow control, Journal of Microelectromechanical Systems 7(4):395-403 (1998).

Yang, X. et al., An electrostatic, on/off microvalve designed for gas fuel delivery for the MIT microengine, Journal of Microelectromechanical Systems, 13(4):660-668 (2004).

The International Search Report, International Preliminary Report on Patentability and the Written Opinion, mailed on Aug. 21, 2008, in related International Application No. PCT/US06/29296, filed Jul. 26, 2006.

Huff et al., A pressure-balanced electrostatically-actuated microvalve, Technical Digest, 1990 Solid-State Sensor and Actuator Workshop, pp. 123-127 (1990).

* cited by examiner

FIG. 1C

- 10 (i): 400 μm
- 10 (ii): 1 μm
- 10 (iii): 0.15 μm
- 10 (iv): 0.002 μm
- (v) Adhesive bond: 1 μm — Gap
- 12 (vi): 0.002 μm
- 12 (vii): 0.3 μm
- 12 (viii): 0.05 μm
- 12 (ix): 6 μm
- 12 (viii): 0.05 μm
- 12 (vii): 0.3 μm
- 12 (vi): 0.002 μm
- (v) Adhesive bond: 1 μm — Gap
- 14 (iv): 0.002 μm
- 14 (iii): 0.15 μm
- 14 (ii): 1 μm
- 14 (i): 400 μm

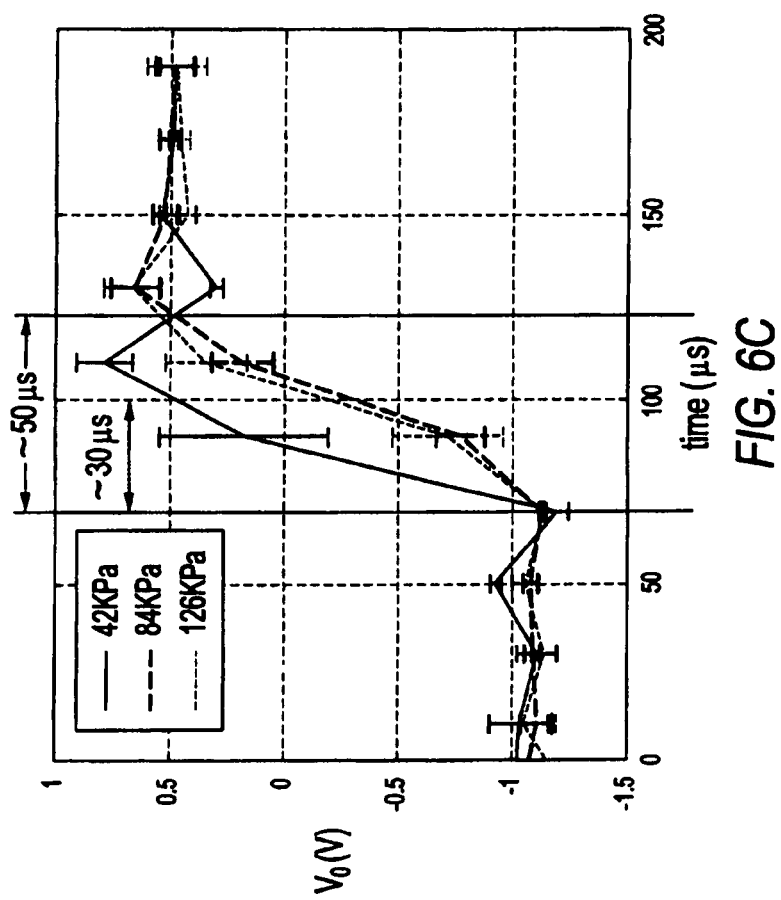

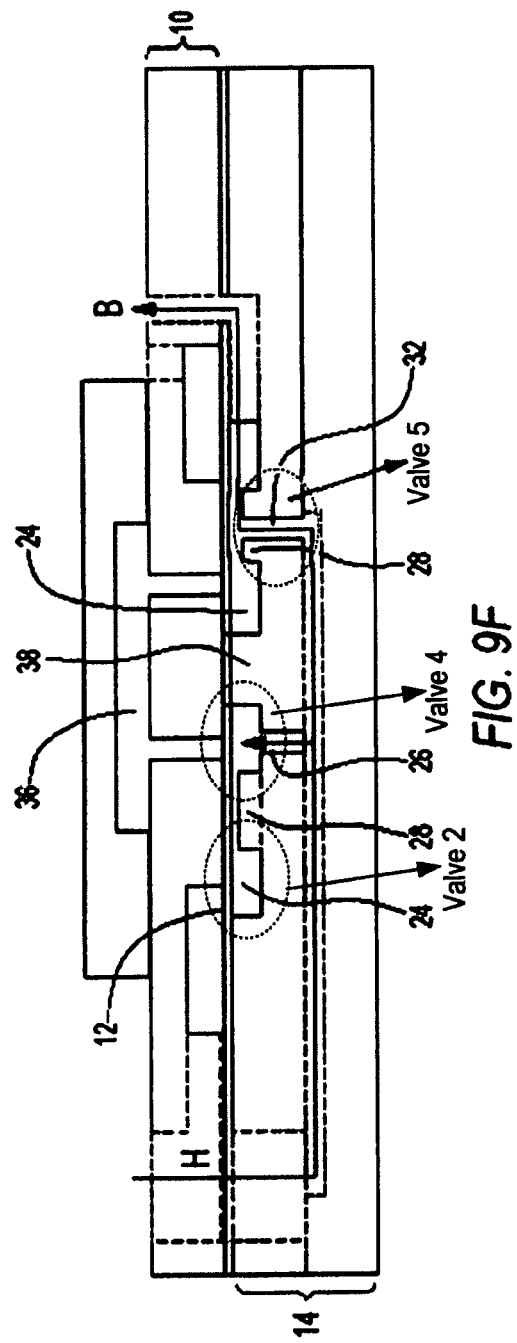

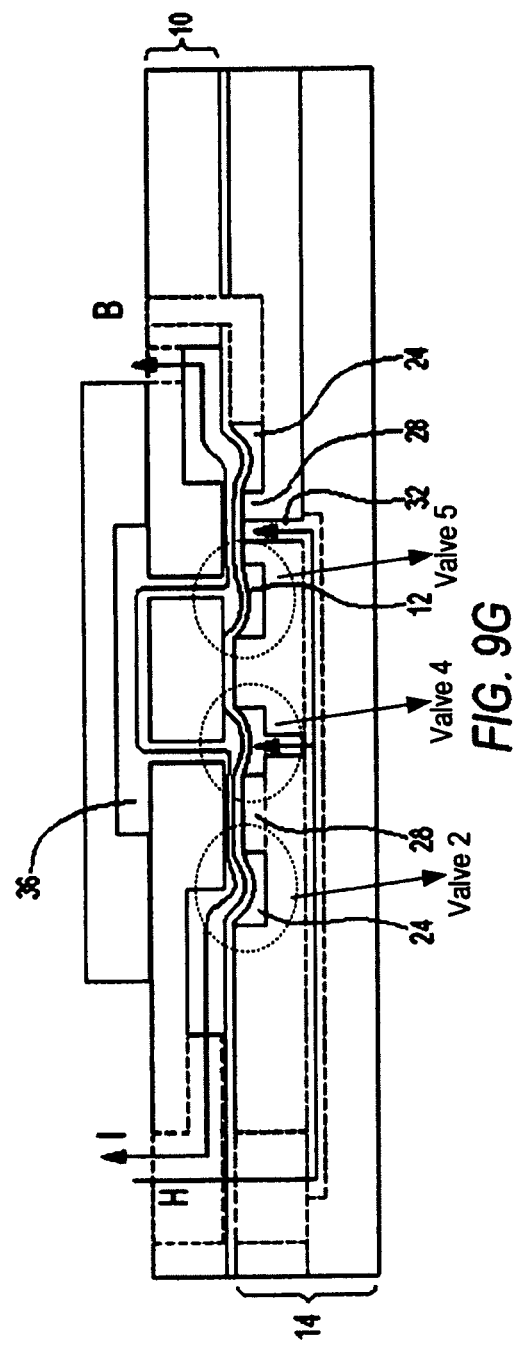

BI-DIRECTION RAPID ACTION ELECTROSTATICALLY ACTUATED MICROVALVE

PRIORITY CLAIM

This application is a Continuation-in-Part of U.S. patent application Ser. No. 11/493,376, filed Jul. 26, 2006, now abandoned which claims priority under 35 U.S.C. §119 to Patent Application No. 60/702,972, filed Jul. 27, 2005, the disclosures of which are expressly incorporated by reference in the entireties.

STATEMENT OF GOVERNMENT INTEREST

This invention was made with Government assistance under Contract No. FA8650-04-1-7121 awarded by the Defense Advanced Research Projects Agency (DARPA). The Government has certain rights in this invention.

FIELD OF THE INVENTION

The invention concerns microfluidics. The invention provides an electrostatically actuated microvalve that can be used in a wide variety of microfluidic applications, e.g., chemical analysis, pre-concentrators, micro-total analysis system (µTAS), gas/liquid sample injection, mixing, lab-on-a chip, micropumps and compressors, etc.

BACKGROUND

Microvalves are the subject of continuing research. Microvalves generally utilize microelectromechanical systems (MEMS) technology to control fluid flow in microfluidic systems. Microvalves have been variously used in chemical analysis, micro-total analysis system (µTAS), gas/liquid sample injection, mixing, lab-on-a chip, micropumps and compressors, and so on.

U.S. Pat. No. 6,148,635, for example, discloses a compact active vapor compression cycle heat transfer device. The device of the '635 patent includes a flexible diaphragm serving as the compressive member in a layered compressor. The compressor is stimulated by capacitive electrical action and drives the relatively small refrigerant charge for the device that is under high pressure through a closed loop defined by the compressor, an evaporator and a condenser. The evaporator and condenser include microchannel heat exchange elements to respectively draw heat from an atmosphere on a cool side of the device and expel heat into an atmosphere on a hot side of the device. The overall structure and size of the device is similar to microelectronic packages, and it may be combined to operate with similar devices in useful arrays. The '635 patent makes use of passive microvalves, e.g., flap microvalves and active electrostatic microvalves in the heat transfer device to direct fluid flow in the closed loop in one direction. In this invention the microvalves simply hold off the fluid flow until a desired high pressure is reached and then they rapidly open. They cannot close against the higher pressures or be switched on and off at any time desired, nor can they bi-directionally route the fluid flow. The active electrostatic microvalves are used simply to hold-off the opening of the microvalve for the pressure to reach higher values. Other types of devices require active microvalves that can be arbitrarily switched in time and can reroute fluid flows.

Active microvalves include an actuator that responds to application of electrical energy, whereas passive microvalves do not. Active microvalves have an important advantage over passive microvalves, in that their fluidic resistances can be changed with respect to time and applied pressure by an applied control voltage or current. Also, an active microvalve can operate in resistance to fluid pressure. On the other hand, passive microvalves are typically smaller and are often easier to fabricate than known active microvalves. Passive microvalves can open rapidly, even as fast as microseconds. Active microvalves, however, take milliseconds or much longer to open or close, particularly if switching high pressures.

Different actuation principles have been used in active microvalves. Actuators that have been tested in active microvalves include solenoid plungers, piezoelectric actuators, electromagnetic actuators, shape memory alloys, pneumatic actuators, bimetallic actuators, and thermopneumatic actuators. The last four types can potentially switch relatively high pressures, but tend to be slow or very slow. Electrostatic actuators have also been investigated due to the ability to scale well as size shrinks and due to potentially very high switching speeds, but with less success. Comb-drive electrostatic actuators have been investigated, but occupy a significant amount of space relative to the overall size of the microvalve, particularly if actuating high pressures. In a comb-drive, the generating electrostatic force is limited due to the inverse proportionality of the force to the gap between the electrodes. Additionally, electrostatic microvalves that employ in-plane actuators, such as comb drives, are ill-suited for out-of-plane flow geometries. In-plane designs have limited applications.

Known electrostatic actuators often require relatively high applied voltages (>100 V) to generate sufficient force to open and close the microvalves against even a modest pressure (0.1 atm) since the electrostatic force is inversely proportional to the square quadratic of gap distance between electrodes, if operated in planar mode, and is proportional to electrode area over seal area if operated in comb drive mode. Known electrostatic microvalves also exhibit a binary open or closed operation, with little ability to operate at positions between fully open and fully closed to adjust flow rates for a given pressure. In addition, normally closed (or fail-closed) electrostatic microvalves have proven difficult to achieve. Typical known designs do not open against a pressure but rather act with applied pressure (i.e., the microvalve seat is pressurized acting to push the microvalve open). Such known electrostatic actuated microvalves tend to be leaky, with relatively high back flows (order of 0.1% or greater with respect to forward flows) possible.

Additionally, known electrostatically actuated MEMS microvalves typically employ silicon-based architectures, with doped silicon as the conductor and silicon oxide or nitride as the material of the seats and valves. This creates relatively hard microvalves and seats, which also have difficulty sealing at the interface and can suffer from wear during operation. Other issues with such microvalve seats include hydrogen bonded sticking ("stiction") problems when humid gases or aqueous liquids are valved, which reduces the reliability of the device.

The issue of discrete flow control from open and closed states has also recently been addressed by developing electrostatic actuator arrays for more precise control of the microflow. See, Collier et al. "Development of a Rapid-Response Flow-Control System Using MEMS Microvalve Arrays," *J. of MEMS*, Vol. 13, No. 6, December 2004, pp. 912-922. To address the issue of relatively high voltage operation of electrostatic devices used to apply high forces, touch-mode actuation has been developed in order to increase the electrostatic force without needing voltages well over 100 V.

One type of touch-mode actuation device that has been proposed uses an unmovable electrode surface shaped in a smooth curve for the other moving electrode to touch with these electrodes continuously, such that the moving electrode is pulled in on actuation. Legtenberg, et al., "Electrostatic Curved Electrode Actuators," *J. of MEMS*, Vol. 6, No. 3, September 1997, pp. 257-265; Li, et al, "DRIE-Fabricated Curved Electrode Zipping Actuators with Low Pull-in Voltage," *Transducers* 03, 2003, pp. 480-483.

Touch-mode actuation generates electrostatic force between the two touching electrodes, which are separated by one or more dielectric layers that prevent electrical shorting and arcing. Achieving high force at reasonable voltage, e.g., less that 100V, requires that the gap between the electrodes be very small, since the magnitude of the electrostatic force is proportional to the square of the electric field. Minimizing the electrode gap competes with other practical difficulties, however, as exemplified by the prior research discussed in the background of this application. One such issue is dielectric breakdown. In the closed position of a touch-mode capacitance microvalve, the spacing between the electrodes is determined solely by the thickness of dielectric separating the electrodes. Ideally, the dielectric thickness would be minimal to increase the electrostatic force generated upon application of voltage to drive the electrodes away from each other. With very thin dielectric layers, e.g., less than a few microns and down to one micron, the electric field becomes too high for typical dielectric materials to sustain. For example, if 100 V is applied across 1 micron, the field is 100 V/micron or 1 megavolt per centimeter, which is very high for typical dielectric materials to sustain. Dielectric breakdown, of course, produces device breakdown.

Another type of touch-mode actuation device that has been proposed involves attaching one and the other ends of the moving electrode to the upper electrode and lower electrode, respectively for the moving electrode to zip with one electrode and to unzip the other electrode, which makes the moving electrode s-shaped. Fluidic capacitance caused by the curved electrode, and longer traveling path of the s-shaped electrode can degrade the microvalve response time. See, Sato, et al. "An Electrostatically Actuated Gas Microvalve with an S-Shaped Film Element," *J. of Micromech. & Microeng.*, Vol. 4, 1994, pp. 205-209; Shikid et al. "Response Rime Measurement of Electrostatic S-Shaped Film Actuator Related to Environmental Gas Pressure Conditions," *Proc. of IEEE MEMS*, 1996; Oberhammer, J., and G. Stemme, "Design and fabrication aspects of an S-Shaped film actuator based DC to RF MEMS switch," *J. of MEMS*, Vol. 13., No. 3, June 2004, pp. 421-428. Complicated curves and shapes present considerable fabrication hurdles, however.

A normally closed flat membrane touch-mode capacitance microvalve that acts out of plane has also been investigated. See, Philpott, et al., "Switchable Electrostatic Micro-Valves with High Hold-off Pressure," 2000 *Solid-State Sensors and Actuators Workshop*, Hilton Head Island, S.C., Jun. 4-8, 2000, p. 226-229. This type of microvalve was demonstrated to be able to hold off very high pressures (>18 atm) applied to the microvalve seat without opening or leaking, and had no measurable reverse leakage or flow. However, the microvalve was not able to close against high pressures (only on order of 1 atm or less), nor could it be opened against a reverse pressure applied to the side opposite the microvalve seat.

A rolling action electrostatically actuated microvalve has been proposed to reduce required actuation voltage. See, U.S. Pat. Nos. 6,968,862 and 6,837,476. In these devices, a diaphragm including an electrode is provided in a space between opposing walls. One of the opposing walls is curved and includes an electrode that is attached to the wall and follows its curved shape. Fluid pressure is also maintained on both side of the diaphragm to reduce the pressure differential and the required actuation voltage. In the '862 patent, the curved shape is to make the diaphragm actuate in a rolling action. This causes the diaphragm to effectively squeeze the fluid out from between the diaphragm and its touch interface with the curved electrode. The curve creates a continuous gradient in the separation distance between the diaphragm and the stationary electrode, and this results in the rolling action that reduces actuation voltage. An embodiment includes a third electrode on the other opposing wall, which has a microvalve seat and is flat. Due to the curve in the upper electrode, the third electrode is at a considerable gap from the diaphragm over a substantial region. The gap acts to increase the time needed for actuation, as well as reduces the pressures over which the microvalve can open and close or switch directions of flow.

Similarly, the touch-mode capacitance systems that use two smooth surfaces, where the diaphragm forms an "S" shape, are designed to make the diaphragm smoothly move from one position the next. If there is a sharp disruption, or jump, in the surface that leaves a gap, the high electrostatic contact force is lost or is greatly diminished, since the electrostatic force created by a given voltage is proportional inverse of the square of the separation distance (distance between the electrode plus dielectric thickness on the membrane). Thus, for example, doubling the distance between the electrodes by creating a gap (the gap is zero when touching, and the force is determined only by the thickness of the dielectric layers), cuts the created electrostatic force for a given voltage a factor of 4. The curves in either type of design create greater distances between the diaphragm/membrane with electrode and the fixed electrodes that must be compensated for with voltage to achieve a given actuation force.

Another important problem with all touch-mode electrostatically actuated devices is that the high electric field within the dielectric can be high enough to cause arcing across the dielectric material over time, and that the dielectric degrades with time, rendering the device useless. In addition, even if the applied voltage is kept low enough that direct arcing failures do not occur, electrical charges can move into the bulk of the dielectric and/or onto the surfaces at the interface of the touch-mode electrodes, which then diminish the electric field providing the actuation force, reducing both the pressure that can be switched and/or increasing the time required for switching.

More problematic is that the charges trapped in the bulk and/or on the surfaces can create an electrostatic sticking force that can prevent the device from working at all. The phenomena of charge trapping has been recognized in the art, but comprehensive solutions that limit the trapping of charges in thin dielectric layers that permit a small gap are lacking. Trapped charges accumulate in time, which can significantly shorten device lifetime and reliability.

Many applications would benefit from a rapid action touch mode capacitance microvalve. Some problems have been individually addressed in prior proposed microvalves, but the present inventors recognize that a need exists for high performing microvalves that operate under significant pressures.

SUMMARY OF THE INVENTION

A preferred embodiment bi-directional electrostatic microvalve of the invention includes a membrane electrode that is controlled by application of voltage to fixed electrodes disposed on either side of the membrane electrode. Dielectric insulating layers separate the electrodes. One of the fixed electrodes defines a microcavity. Microfluidic channels formed into the electrodes provide fluid to the microcavity. A central pad defined in the microcavity places a portion of the second electrode close to the membrane electrode to provide a quick actuation while the microcavity reduces film squeezing pressure of the membrane electrode.

In preferred embodiment microvalves, low surface charge trapping and low surface energy coatings coat low bulk charge trapping dielectric on the electrodes. An example preferred low surface charge trapping layer is a thin nitride layer. An example of a preferred low surface energy layer is a fluorocarbon film made from cross-linked carbon di-fluoride monomers or surface monolayers made from fluorocarbon terminated silanol compounds. Layer combinations in preferred embodiments limit charge trapping and other problems and increase device lifetime operation.

BRIEF DESCRIPTION OF THE DRAWINGS

FIG. 1C illustrate the material layer structure of a second preferred electrostatically actuated microvalve embodiment.

FIGS. 6A, 6B, and 6C show measured response times when the microvalve is closed in the test set up of FIG. 5A;

FIG. 9F is a cross-sectional schematic view along line AA of FIG. 9D of the preferred five valve microvalve embodiment in the sample heating state of FIG. 9B showing valves 2 and 4 closed and valve 5 open; and FIG. 9G is a cross-sectional schematic view along line AA of FIG. 9E of the preferred five valve microvalve embodiment in the sample injection state of FIG. 9C showing valves 2 and 4 open and valve 5 closed.

DETAILED DESCRIPTION OF THE INVENTION

Figure 1A:
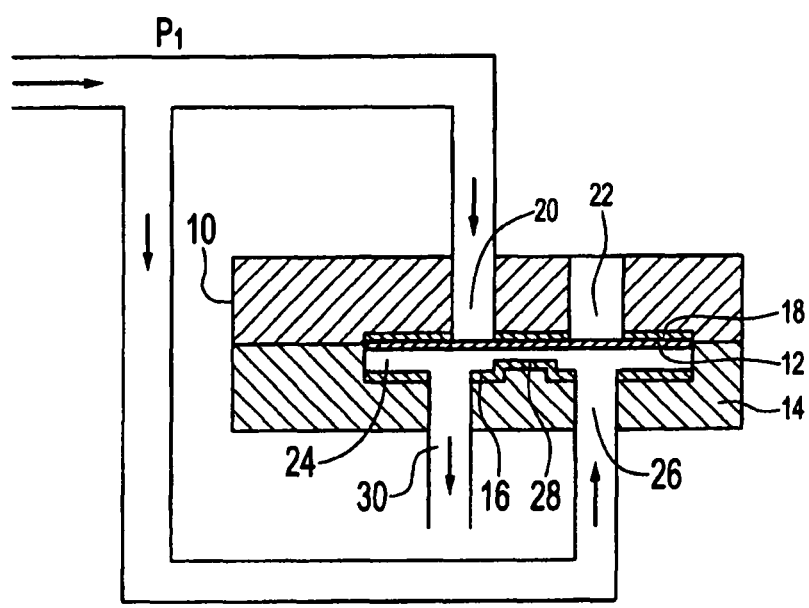
FIG. 1A is a cross-sectional schematic view of a preferred electrostatically actuated microvalve embodiment.

A preferred embodiment bi-directional electrostatic microvalve of the invention includes a membrane electrode that is controlled by application of voltage to fixed electrodes disposed on either side of the membrane electrode. Dielectric insulating layers separate the electrodes. One of the fixed electrodes defines a microcavity. Microfluidic channels formed into the electrodes provide fluid to the microcavity. A central pad defined in the microcavity places a portion of the second electrode close to the membrane electrode to provide a quick actuation while the microcavity reduces film squeezing pressure when opening the membrane electrode.

In preferred embodiment microvalves, low surface charge trapping and low surface energy coatings coat low bulk charge dielectric layers. In preferred embodiments, thin silicon nitride coatings provide low surface charge trapping dielectric. For low surface energy, fluorocarbon films made from cross-linked carbon di-fluoride monomers or surface monolayers made from fluorocarbon terminated silanol compounds coatings can be used. Layer combinations in preferred embodiments limit charge trapping and other problems and increase device lifetime operation.

In preferred embodiments, the closed position of the microvalve is defined by a non-deformed state of the membrane electrode, which in that position, seats against one of the fixed electrodes to seal an inlet and outlet defined in the fixed electrode. This position may be assisted by fluid pressure on an opposite side of the membrane electrode. The membrane is deformed by attraction to a fixed electrode and/or repulsion from the other fixed electrode. The fixed electrode that defines a microcavity includes a central pad disposed between inlet and outlet ports. The central pad reduces the gap to the membrane electrode, while allowing the membrane to deform sufficiently into the other parts of the microcavity defined by the lower electrode to permit a predetermined amount of fluid flow. The space in the microcavity around the central pad accommodates portions of the membrane electrode, providing a large space for fluid to flow from the inlet to the outlet when the microvalve is in the open position. Depending upon the level of voltage applied, the microvalve can be fully open into the surrounding space, to a fully open position or at any number of intermediate positions between fully open and fully closed. The membrane electrode can be moved back to the fully closed position by application of voltages to the electrodes and can close against substantial fluid pressure.

A preferred embodiment bi-directional electrostatic microvalve utilizes touch-mode capacitance actuation for the initial and final positions for opening and closing the microvalve, and is constructed of three electrodes. Intermediate positions employ capacitive action across a gap without any rolling action touch-mode actuation. A middle electrode is a flexible movable membrane that contains an imbedded electrode. Another electrode is a closing electrode that includes transverse fluid ports against which the membrane seats and seals. A third electrode is a fixed opening electrode used to provide an opening force to attract the membrane away from the microvalve seat to allow fluid flow between the transverse ports. The third electrode also defines a microcavity. The third (opening) electrode includes a central pad to increase the electrostatic force by decreasing the gap between part of the membrane electrode and the opening electrode, permitting the membrane to deform sufficiently into the other parts of the microcavity defined by the third (opening) electrode to permit a predetermined amount of fluid flow. Preferably, fluid pressure is used to assist microvalve switching time and handling pressure. The membrane, opening and closing electrodes are controlled separately for bi-directional operation.

A microvalve of the invention can exhibit important operational advantages, including high speed operation. A microvalve of the invention can change states in tens of microseconds or less. Example switching times of 50 microseconds and less to open and close, respectively, over different pressures (exceeding 1 atm) have been demonstrated with prototypes. Faster switching times are possible, as is operation at higher pressures. Power consumption can be very small compared to most other active microvalves.

In preferred embodiments of the invention, power is consumed only during activation (opening or closing). Relative fluid pressures and/or physical resilience of the membrane electrode can maintain the membrane in the position set by the open or close operation. Only a very small leakage current occurs at steady state (low duty cycles) and energy recovery (~80%) with an inductor can be used for high duty cycles.

Preferred embodiment microvalves of the invention are able to open and close against a high pressure, either on the microvalve seat or opposite side, with a very fast time response, while still taking advantage of low to no leakage current touch-mode operation with extremely low power consumption. Preferred embodiment microvalves of the invention can also be sized for a variety of fluid flows, liquid or gaseous, and can be arrayed to gain relatively high fluid flow control. A microvalve in accordance with the invention can be designed to be normally open or closed, with failure in either of those two states. If the balance pressure is much lower than the inlet pressure, then the microvalve fails open if no voltage is applied to keep the device closed. If the balance pressure is much higher than the inlet, or if the tension in the membrane electrode is made to be high (providing a closing spring-type force), then the microvalve will remain closed with no voltage applied to either electrode.

The invention addresses requirements for many applications, e.g., chemical analysis, micro-total analysis system (μTAS), gas/liquid sample injection, mixing, lab-on-a chip, micropumps and compressors, and so on. Embodiments of the invention provide for actively and rapidly switching on and off fluid flows, or rerouting flows in two or more directions. Microvalves of the invention can handle fluids that are under high pressures typically only operated with passive microvalves in past devices. Embodiments of the invention accomplish switching under significant pressures with electrical actuation at low voltages and power consumption.

Example embodiments will now be discussed with respect to the drawings. Some of the drawing figures are presented schematically, but will be understood by artisans. The actuation electrodes may be referred to as an upper electrode and a lower electrode while no particular disposition is indicated by "upper" and "lower" as the upper and lower electrodes may be disposed to the right and left of the membrane electrode if the microvalve is situated such that the membrane electrode is disposed vertically as opposed as horizontally as used in the drawings for convenience of illustration. Artisans will also understand inventive features from the discussion of the example embodiments.

FIG. 1A illustrates a preferred embodiment microvalve. As illustrated in FIG. 1A, the microvalve includes three electrodes—an upper fixed electrode 10, a movable membrane electrode 12, and a lower fixed electrode 14. Dielectric 16, 18 separates the electrodes, even when the surfaces are in contact so that the electrode cannot electrically short out. Small leakage current typically having a maximum that is on the order of femtoamps (10-15 fA) can flow between the electrodes 10, 12, 14 through the dielectric 16, 18 when electrodes are touching each other.

The upper fixed electrode 10 defines transverse fluid ports including an inlet 20 and an outlet 22 with microfluidic channels leading to and from the ports. The membrane electrode 12 seats against the inlet 20 and outlet 22. While a single inlet and outlet are illustrated in the upper fixed electrode 10, that electrode can include multiple inlets and outlets, which can be controlled by the membrane electrode 12. The lower fixed electrode 14 defines a microcavity 24 to accommodate deformation of the membrane electrode 12. A pressure balance port 26 is in the lower fixed electrode 14. A central pad 28 reduces a gap between a portion of the lower fixed electrode 14 and the membrane electrode 12. The central pad 28 is aligned between the inlet 20 and outlet 22. It is aligned with the central portion of the membrane electrode 12 as it is most readily pulled away from its seated position. The central portion of the membrane electrode 12 is the least resilient portion as it is farthest from fixed ends of the membrane electrode 12. Also, fluid pressure from the inlet 20 is nearby. The central pad 28 reduces the gap but also allows the membrane electrode to deform sufficiently into the microcavity 24 for fluid flow.

While a single microvalve is illustrated, microvalves can be arranged in series or other networks. FIG. 1A shows a preferred embodiment microvalve that has a normally closed position, which will also fail in the closed position. The flow of fluid will travel from the inlet 20 to the outlet 22. The membrane electrode 12 will be attracted to the upper or lower fixed electrode 10, or 14 depending on which side has a voltage potential applied between the membrane electrode 12 and the upper or lower fixed electrode 10, 14. The upper fixed electrode 10 normally touches the membrane electrode 12, blocking flow from the inlet 20 to the outlet 22. Fluid pressure from the pressure balance port 26 assists this position and is preferably sufficient to maintain the closed position in the absence of applied voltage. When a potential, V1, is applied to the membrane electrode 12 with respect to the upper fixed electrode 10, an electrostatic force attracts the membrane electrode to the upper fixed electrode 10, and the membrane electrode 12 will seat tightly and can hold-off very large forward pressures at the inlet 20 (up to more than 20 atm or higher depending on the area of the inlet 20 vs. the surrounding membrane electrode area). When the voltage is equalized between the membrane electrode 12 and the upper fixed electrode 10, and a potential, V2, is applied to the lower fixed electrode 14 with respect to the membrane electrode, an electrostatic force pulls the membrane electrode 12 away from the upper fixed electrode 10 towards the lower fixed electrode 14.

The lower fixed electrode 14 has the central pad 28 disposed centrally in the microcavity 24. The pad 28 is much closer (about 10 microns or less versus about 100 microns for the microcavity 24 in a preferred embodiment) to the membrane electrode 12 than the remaining portions of lower fixed electrode 14 that define the microcavity 24. From the closed position, the central pad 28 generates much stronger force (up to the order of 100 times stronger) on the central portion of the membrane electrode 12 than the remaining portions lower electrode 14 do because of the increased force caused by the decreased gap. The stronger force pops the membrane electrode 12 off the upper electrode 10, creating a faster response for fluid to flow between the inlet and the outlet ports 20, 22. The larger volume beneath the membrane electrode 12 in the lower electrode microcavity 24 between the central pad 28 and edge of the lower electrode microcavity 24 allows the fluid to flow more easily, and reduces the squeeze film damping that occurs between the membrane electrode 12 and lower electrode 14.

The size of the central pad 28 also determines how much pressure the lower electrode microcavity 24 can have with respect to the inlet 20 and outlet 22 in order to open and close quickly. In general, the larger the central pad 28, the faster the opening time for a given applied voltage, gap distance, and pressure at the pressure balancing 26. However, for the same conditions, the closing time will slow with increasing central pad size. Preferably, the central pad 28 and microcavity 24 are sized to produce comparable fast open and close times.

The depth of the microcavity 24 into which portions of the membrane electrode move is also determined in part by the flow rate of the fluid moving through the device. Making the microcavity 24 surrounding the central pad 28 deeper than the gap between the membrane electrode 12 and the central pad 28 creates a larger cross-sectional area for fluid to flow between the inlet and outlet, than that permitted by the distance to the central pad 28 itself. This feature prevents excessive pressure drop across the device, and permits variable flows to be controlled by adjusting the voltage. Higher voltages will pull the membrane electrode 12 further into the microcavity 24 by capacitive action without touch-mode actuation, creating a larger cross-sectional area and thus a lower pressure drop. However, if the depth of the microcavity 24 creates a much larger cross-sectional area than that of the inlet and outlet ports, the benefit of further increases diminishes. In addition, a greater depth requires a higher voltage to pull the membrane electrode 12 into the microcavity 24, requiring higher voltages to adjust the flow rates. Therefore, microcavity depths much more than 500 microns have little practical use for microscale fluid flows.

The upper fixed electrode 10, membrane electrode 12 and lower fixed electrode 14 have substantially flat surfaces and are preferably semi-conductor fabricated layers. The lack of curves and complicated shapes permits the use of semiconductor materials and semiconductor fabrication techniques. In a preferred embodiment, the fixed electrodes 10 and 14 are formed from silicon, for example, with a silicon oxide or silicon nitride dielectric.

Figure 1B:
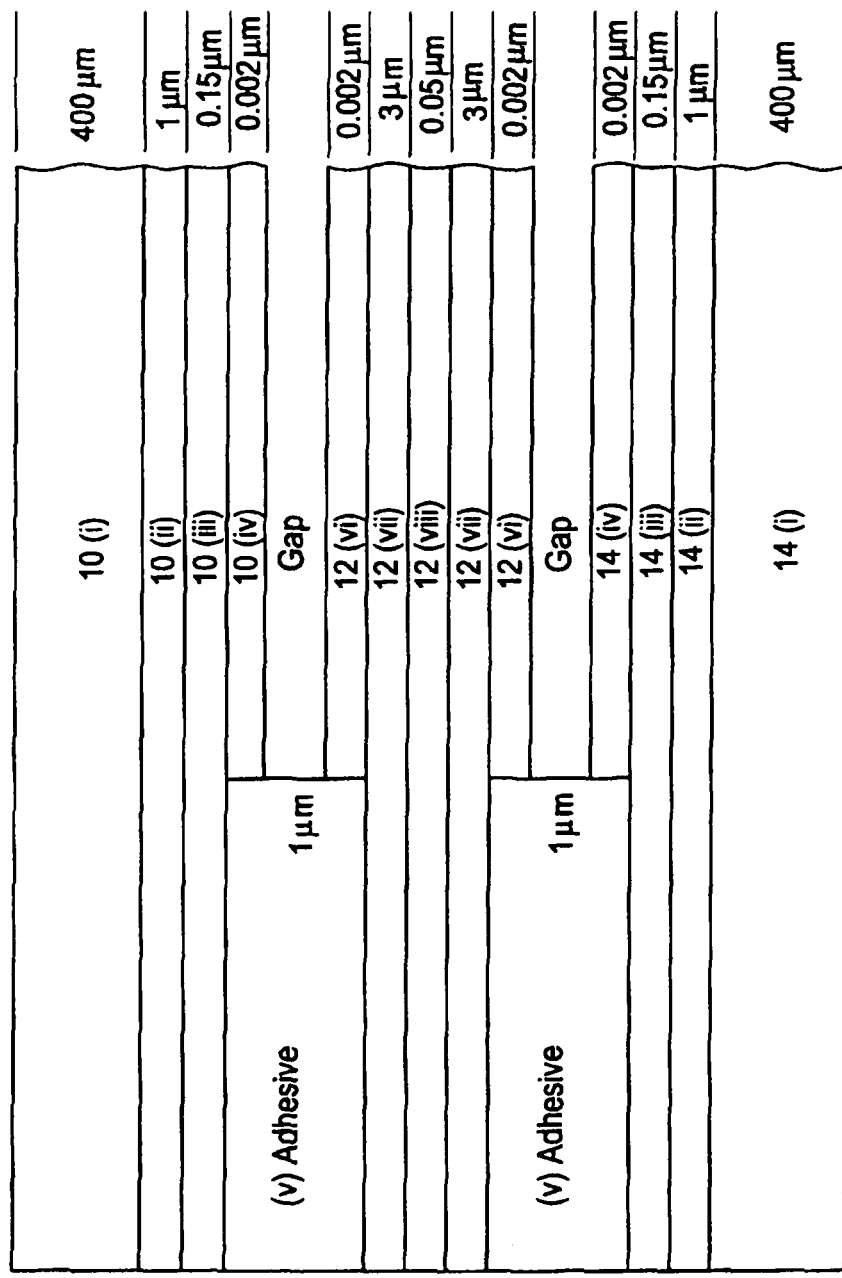
FIG. 1B illustrates the material layer structure of a preferred electrostatically actuated microvalve embodiment.
Figure 2:
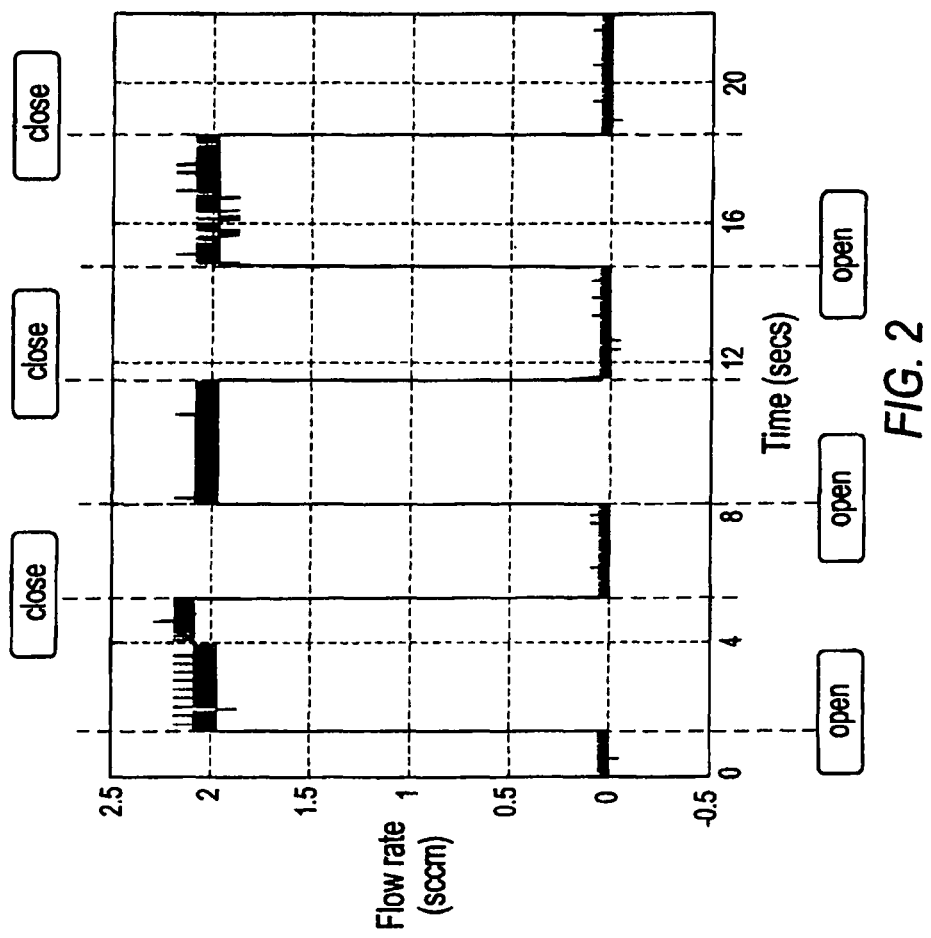
FIG. 2 is a graph of flow response for an example microvalve consistent with the FIGS. 1A-1C preferred embodiment under conditions of 1 psi applied pressure between the inlet and the outlet when the microvalve is alternately opened and closed.

FIG. 1B illustrates the material layer structure of a preferred embodiment electrostatically actuated microvalve. The embodiment is consistent with the FIG. 1A device. The FIG. 1B material layer structure has been fabricated in experimental embodiment devices. With reference to FIG. 1A, layers 10 (*i-iv*) in FIG. 1B constitute the upper fixed electrode 10. Layers 12 (*vi-viii*) are the movable membrane electrode 12. Layers 14 (*i-iv*) constitute the lower fixed electrode. Layers having the same material properties (and in example experimental embodiments, the same materials) are labeled with common roman reference numbers. Layers are labeled according to function, and some of the layers in FIG. 1B are multi-layers.

Layers i are structural layers, such as silicon. Layers ii are conductive layers, such as a metal layer, or doped silicon layer. Layers iii are dielectric with low bulk charge trapping properties, such as silicon dioxide. Layers iv and vi are thin multi-layers with low surface energy and low charge trapping. Silicon nitride has low surface charge trapping. Low surface energy can be provided in layers iv by Teflon® or other fluoropolymers in a very thin added layer to the low surface charge trapping material. $CF_x$ and heptadecafluoro-1, 1,2,2-tetrahydrodecyl provide low surface energy in preferred embodiments. An aromatic polyester is another low surface energy material.

The dimensions shown for layer thicknesses are example embodiment dimensions, and were the dimensions of an experimental embodiment device in accordance with FIGS. 1B and 1C.

In addition, patterned adhesive layers v are shown. As mentioned, in preferred embodiments, the electrodes 10, 12 and 14 are bonded together. However, in some instances, external forces can be applied to the upper fixed and lower fixed electrodes 10 and 14 to hold the microvalve together. In such embodiments, adhesive can be omitted. The adhesive layers v are preferably very thin, less than 10 microns, and preferably less than about 1 micron. Such thin adhesive layers were demonstrated to be effective in sealing experimental embodiment microvalves. The layers iv and vi are patterned, as is the adhesive, as the low surface energy of the layers iv and vi would inhibit the function of the adhesive layers v.

A preferred adhesive is an epoxy adhesive. Patterned adhesive can be applied, for example, to the upper fixed electrode 10 and the lower fixed electrode 14 via contact printing, and then the electrode 10, 12, and 14 can be adhesive bonded together. Epoxy adhesive bonding is effective in preventing leaking of fluids between layers 10 and 12, or 14 and 12. Additionally, the microvalve can be part of a larger stack of layers defining, for example, a microfluidic network, additional microvalves, or the like.

Layers vii are dielectrics that also serve as the mechanical structure of the membrane, e.g., polymide. Layer viii is a conductive layer. In preferred embodiments, layer viii is a metal multilayer, e.g. Cr/Au/Cr.

FIG. 1C illustrate the material layer structure of another preferred embodiment electrostatically actuated microvalve. The embodiment of FIG. 1C is also consistent with 1A and is similar to FIG. 1B. In the embodiment of FIG. 1C, however, the membrane 12 composition is different. Two thin conductive layers viii are used, with a middle structural layer ix, e.g., polyimide. Since layer ix provides structure, layers vii need not be structural dielectrics in the FIG. 1C embodiment. This opens a broader range of materials, or permits much thinner dielectric layers to be used to isolate the conductor in the membrane electrode 12.

As mentioned above, the membrane electrode 12 in preferred embodiments is a Cr/Au/Cr imbedded metal layer in polyimide. Other suitable polymer dielectrics for imbedding the metal layer of the membrane electrode include parylene, Teflon®, Nafion®, polyester, polybutylene, and polydimethylsiloxane (PDMS)

In preferred embodiments, the fixed electrodes 10 and 14 are a semiconductor and its oxide, with an additional nitride film. The nitride film is preferably only a few monolayers thick. This film provides low surface charge trapping and is preferably used with a low surface energy film, e.g., Teflon, and such a thin multi-layer is effective both in preventing stiction and surface charge build up. In additional embodiments, a dielectric oxide and nitride monolayers are also used to isolate the metal layer of the membrane electrode 12.

Table 1 gives voltages used to open the microvalve in a preferred embodiment as a function of the gap between the central pad, 28, and the membrane electrode 12, when the membrane electrode 12 is against the upper fixed electrode, 10. These voltages vary as a function of the dielectric thickness, the tension in the membrane electrode 12, and the composition of coatings on the dielectric 16, 18. Voltage rises rapidly as the gap increases. High voltages are a difficulty because they create a large electric field when the microvalve opens and the membrane electrode 12 touches the central pad 28. With a gap of about 250 microns, the electric field exceeds the breakdown voltage of most polymers. As a practical matter, the electric field should be below 200 V/micron and preferably below 50 V/micron to prevent long-term degradation of the membrane. That limits the distance to be below about 150 microns and preferably below about 25 microns. Fabrication is difficult if the distance is less than 1 micron. 0.1 microns represents a practical lower limit with conventional MEMS fabrication tools.

TABLE 1

Voltage Used to Open Microvalve

| Distance between central pad, 28, and membrane, 12, when the membrane is against the upper fixed electrode, 10 {microns} | Voltage needed to open for a preferred embodiment {Volts} | Electric field on a 2 micron thick membrane electrode 12 when the membrane electrode, 12, first touches the central pad, 28 {Volts/micron} |
|---|---|---|
| 0.1 | 41.8 | 20.9 |
| 1 | 49.9 | 25.0 |
| 5 | 76.3 | 38.1 |
| 10 | 100.0 | 50.0 |
| 15 | 119.2 | 59.6 |
| 25 | 151.2 | 75.6 |
| 50 | 215.4 | 107.7 |
| 75 | 273.3 | 136.6 |
| 100 | 331.6 | 165.8 |
| 150 | 459.1 | 229.5 |

The microcavity 24, central pad 28, upper fixed electrode 10, and membrane electrode 12 have flat surfaces. The flat surfaces are readily fabricated by conventional semiconductor microfabrication techniques, without resort to machining steps. Machining steps, such as those required for curved or arched surfaces increase the lowest possible size limit and do not readily translate to mass fabrication techniques.

Additionally, low surface charge trapping and low surface energy coatings are readily added during semiconductor fabrication techniques. Low surface charge trapping and low surface energy coatings are preferably added to all of the electrodes, as have been described. These types of coatings also inhibit the accumulation of water on the surfaces and within the bulk of the dielectric layers, which can act to decrease lifetime and reliability.

The time response of the microvalve is determined by the specific application, in particular which are much more important factors in gas chromatograph injector microvalve, chemical analysis, and etc. The important factors can be injector pressure (which depends on the pressure across the microvalve), flow rate (which depends on both the pressure across the microvalve, the microvalve orifice size, the membrane electrode 12 thickness and size), and the lower electrode microcavity 24 size, and the voltage across the membrane electrode 12 and current that is carried through the microvalve (which depends on the applied voltage, the capacitance and resistance of the microvalve and circuit). Pressure from the pressure balance port 26 also factors into response time. The balance pressure is added to balance pressure on both sides of the membrane electrode 12, thereby decreasing the net pressure across the membrane electrode 12 to increase both the pressure the microvalve can handle and speed of opening and closing. The pressure can be adjusted to be different on both sides of the membrane electrode 12 to apply a pneumatic actuation in addition to the electrostatic force, to control open and closing times, as well as to determine if the device fails open or closed.

This allows, for example, the pneumatic action across the microvalve to be adjusted as desired to create faster opening microvalves (by reducing the pressure in the pressure balancing port 26 on the lower electrode side) or faster closing microvalves with lower leakage of fluid from the inlet 20 to the outlet 22 (by increasing the pressure at the pressure balance port 26 on the lower electrode side). For the FIG. 1A embodiment, even when the pressure is initially equal on both sides of the membrane when the microvalve is closed, once fluid starts flowing from the inlet 20 to the outlet 22, the pressure acting on the upper side of the membrane electrode 12 will decrease due to the Bernoulli principle and the pressure at the pressure balance port 26 will be higher than at the inlet 20, acting to help close the microvalve. By providing a second pressure balance port 30 in the lower electrode microcavity 24 and allowing fluid to flow out of the pressure balance port 26, the pressure can be adjusted to be higher or lower than at the inlet 20. A regulator and/or orifice can also be added to either the inlet 20, outlet 22, or at the pressure balance port 26 to adjust the pneumatic actuation to the value desired for other embodiments of this invention.

Example devices have been fabricated. The fabrication and testing of example devices will now be discussed. Artisans will understand additional features from the discussion.

An experimental device consistent with FIGS. 1A-1C has been fabricated using Deep Reactive Ion Etching (DRIE) of silicon wafers to open up fluid ports (inlet, outlet, and fluid channels at the ports), and to create the lower electrode microcavity 24 and central pad 28. The silicon wafer is subsequently selectively doped to create conductive surfaces within the silicon for the upper and lower electrodes. Next a film is grown on the silicon to prevent charge injection from the silicon to the membrane to prevent slow degradation of the membrane due to charge buildup. First a 1.5 micron thick thermal silicon oxide is grown over the entire wafer. Next a 1 nm thick silicon nitride layer is added. Then a low power plasma containing $C_4F_8$ is used to create a 0.1 to 10 nm thick film containing $CF_2$ monomers that are reacted to create a $[CF_2]_n$, or $CF_x$, composition. Regions are patterned and opened through the thermal oxide insulator and metal applied to create Ohmic contacts through which the electrostatic potentials V1 and V2 can be applied and through which electric current can flow.

Those skilled in the state of the art will note that dielectric materials other than silicon oxide and silicon nitride can be used for respective low bulk charge trapping and low surface charge trapping dielectric layers. Additionally, fluorinated materials other than $CF_x$ can be used for low surface area contact layers. For the low surface energy layers, a film containing heptadecafluoro-1,1,2,2-tetrahydrodecyl groups, made from heptadecafluoro-1,1,2,2-tetrahydrodecyl trichlorosilane (FDTS) can also be used. The layer thickness must be at least 1 nm thick to avoid excessive wear and can be up to 100 nm thick for $CF_x$ for extended life. Layer thickness of $CF_x$ less than 10 nm fail more rapidly. The voltage necessary to operate the device rises quickly when the total thickness of the dielectric and coating layers is more than 5 microns thick and reaches unusable levels when the layers thickness is greater than 10 microns. Total layer thicknesses below 0.1 microns have higher failure rates. Total layer thicknesses below 0.05 microns fail even more often. In a preferred embodiments, total layer thicknesses are between 0.2 and 3 microns, and most preferably about 1.5 microns.

It is also important for the layer to repel water. Water, which is present in many fluids such as air, leads to increase in stiction and surface charge trapping, which in turn increases the voltage needed to actuate the device. The $CF_x$ and heptadecafluoro-1,1,2,2-tetrahydrodecyl in the layers above also prevent undue water from being adsorbed on the layer, where we define the accumulation of undue water as that sufficient to raise the voltage to open the device by 5 volts.

The membrane in the experimental device was fabricated using a polyimide polymer that is spun on and cured in a low pressure environment absent of any water vapor, which we define as a vacuum cure, on a separate glass carrier plate. The vacuum curing is found to substantially enhance breakdown voltage. The preferred temperature of the curing of polyimide is from a low of 350° C. and a high of 450° C. The membrane needs to be at least 0.1 microns thick to avoid premature failure. Membranes thicker than about 20 microns are typically too stiff for the preferred embodiment of a microvalve. Larger devices can utilize thicker membranes. Preferred dimensions are between 1 and 3 microns thick. The polyimide polymer is metallized with thin layers of chrome, gold, and then chrome, which are then patterned to provide an electrically conductive layer within the membrane. A second polyimide polymer layer is spun on and vacuum cured over the metal layer. Holes are patterned with photoresist and etched using oxygen plasma to open up electrical contacts to the metal layer within the stack. The oxygen etches down and stops on the upper chrome layer, which is subsequently removed using a commercially available chrome etchant, exposing the gold layer to allow electrical contact. The polymer/metal/polymer sandwich stack is then transferred, aligned, bonded, and released to one of the silicon layers using an adhesive layer that is applied to the silicon via contact printing.

The bonding of the layers together enables higher pressures to be switched, since without the adhesive bonding, leakage from the inlet to the outlet, as well to the outside environment, can occur more easily. The adhesive layer used in the preferred embodiment is an epoxy adhesive made from a mixture of Dow Corning solid epoxy novalac-modified resin with curing agent in a 2.5:1 mass ratio, and various solvents (2-methoxyethanol 15 to 50% by mass range, anisole 15 to 50% by mass range, and PGMEA 0 to 10% by mass range, the exact amounts depend upon the adhesive layer thickness desired). Most often, the solvents are selected to modify the viscosity of the adhesive in order to achieve a thickness of 1 µm via spin coating and to achieve sharp interfaces. For a complete description of the spin coating process, see Flachsbart, B. R., K. Wong, J. M. Iannacone, E. N. Abante, R. L. Vlach, P. A. Rauchfuss, P. W. Bohn, J. V. Sweedler, and M. A. Shannon, "Design and fabrication of a multilayered polymer microfluidic chip with nanofluidic interconnects via adhesive contact printing," *Lab-On-A-Chip*, 6, 667-674, 2006. Other adhesives can be used, including those made from biphenol compounds, which cure at a higher temperature and demonstrate higher bond strengths. The key issues of the adhesive layer are that: (1) it is thin (less than 20 microns and preferably in a range of 0.1 to 3 microns and more preferably in the range of 0.2 to 0.4 microns), (2) it bonds the interfaces together to enable the device to sustain high pressures, (3) it is aligned and contact printed on the microvalve interfaces and the membrane electrode is free to move from the first to second said electrodes, and (4) so that the low surface energy and low surface charge trapping coatings are not affected by the adhesive layer.

In preferred microvalve fabrication methods, adhesive is applied by contact printing. Preferred steps for contact printing include first coating a temporary carrier with adhesive (e.g., a PDMS (Polydimethylsiloxane) stamp). The adhesive is then pressed onto the fixed electrodes (10 or 14) be bonded with the membrane electrode and is cured under pressure with heat. Preferably, the adhesive is applied first to the first fixed electrode 10 (by pressing the compliant PDMS stamp that has the adhesive spun onto it), and then the Membrane assembly is pressed onto the first fixed electrode and is cured under pressure and heat. Then the adhesive is applied to the PDMS stamp again, and it is pressed onto the second fixed electrode 14. The second electrode 14 is then pressed onto the first electrode 10 and membrane electrode 12 and is cured.

During the process, the adhesive is contact printed only onto the areas of the fixed electrodes 10 and 14 that have been patterned to lack a low surface energy film coating. Solvents may be used to modify the viscosity of the adhesive in order to achieve a thickness of preferably less than 10 µm, and most preferably about 1 µm via spin-coating and to achieve sharp interfaces between the those areas printed with the adhesive, and those areas without adhesive. In other embodiments, the adhesive can be applied to the membrane electrode 12.

The adhesive preferably bonds the layers by covalent bonding, or by being physically keyed into the layer (for example, by the adhesive flowing into a pore having an opening smaller than the interior, prior to curing). Since the layers are held on the carrier plate by non-covalent forces, for example by hydrogen bonding, they can be released from the carrier plate without affecting the adhesive. The adhesive preferably forms a solid resin, such as a bisphenol-A based resin adhesive. Examples include DER 642U, DER 662, DER 663U, DER 664U, DER 665U, DER 667 and DER 672U, all from Dow Corning. These adhesives use a hardener, such as DEH 82, DEH 84, DEH 85 and DEH 87, all from Dow Corning. The adhesive may also be an epoxy adhesive mixture of solid epoxy novalacmodified resin with curing agent in a 2.5:1 mass ratio. Solvent may be added to the adhesive to control the viscosity, for example 2-methoxyethanol (15 to 50% by mass), anisole (15 to 50% by mass), and PGMEA (0 to 10% by mass) range. The bonding of the layers may be carried out by heating to cure the adhesive, for example at 130° C. and 5.2 MPa of applied pressure under vacuum for 10 minutes. The temporary adhesive carrier is an elastic polymer, such as a 3 mm thick 50 mm diameter PDMS disk; the carrier plate may be released from the layer by using a hot water bath at approximately 50° C. for 5 minutes. The adhesive may be given a final cure, for example by heating the completed device for 12 hours at 130° C.

Those skilled in the state of the art recognize that many other flexible polymers could be used including parylene, Teflon®, Nafion®, Viton®, polyester, polybutylene, PDMS, and other dielectric polymers with reasonable electrical breakdown strength.

The other silicon half is bonded to the membrane using the same process. The resulting microvalve is then placed in a plastic package developed to apply pressures and electrical potentials using standard fittings. The plastic package can also be used to hold the pieces together instead of bonding, particularly for lower operating pressure devices.

Figure 3B:
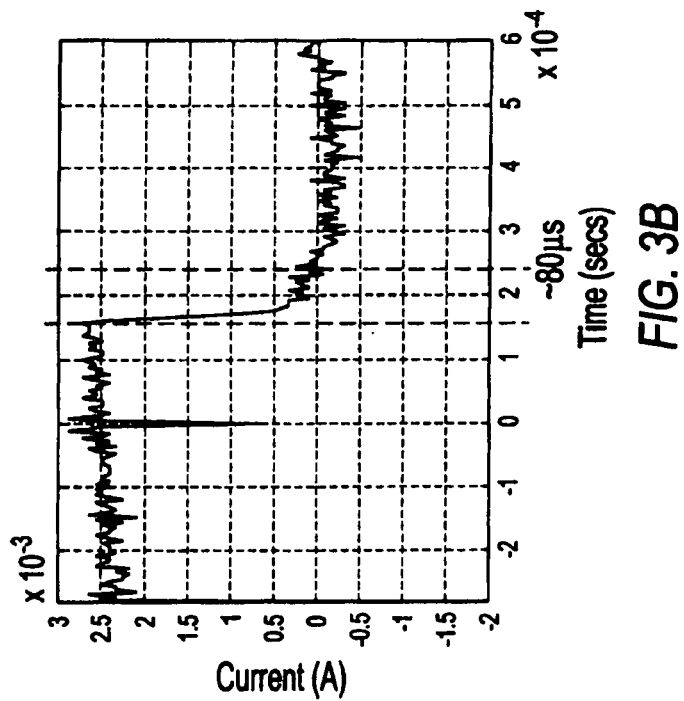
FIGS. 3A and 3B show measurement of current from the application of a voltage V1 and removal of V1 for an example device to illustrate a conservative estimate of response time, which will be faster than 20 μs (FIG. 4A) to open and 80 μs (FIG. 4B) to close the microvalve.
Figure 3A:
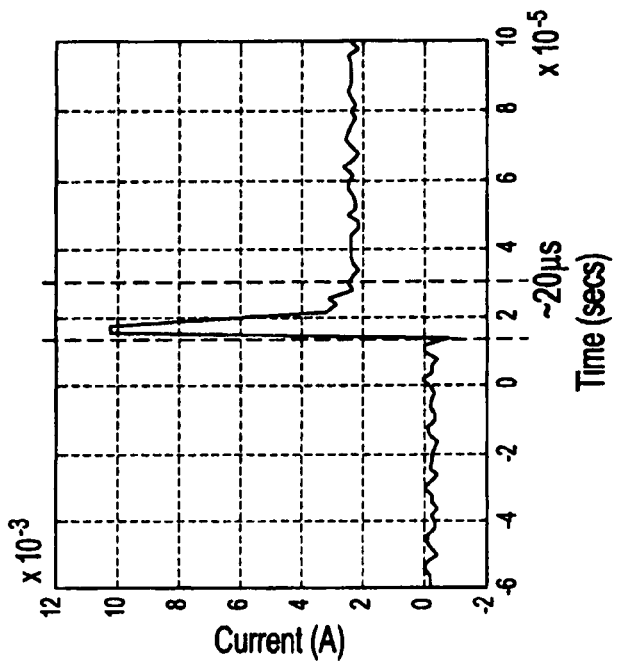

FIG. 3 shows the flow response between the injection inlet and the outlet when the experimental microvalve is alternately opened and closed. In this test, only the upper and membrane electrode are electrostatically actuated, which means V1 is applied on and off to close and open the microvalve, respectively. The potential at V2 is floated with respect to ground. A pressure, P1, of 1 psi is also applied only to the upper electrode for this test. However, this is the same condition as that when there are much larger pressures than 1 psi at the upper electrode than at the lower electrode, regardless of the applied pressure. Nevertheless, the actual microvalve response time appears to be as fast as 20 µs and 80 µs to open and close the microvalve, respectively as shown in FIG. 4.

These measurements are obtained by measuring the electric current required to operate the microvalve, which is directly proportional to the microvalve position (open and closed). Since this current is coupled with the mechanical dynamics of the microvalve, the current measurement reflects the actual response time of the microvalve, while the flow sensor output includes its fluidic resistance and capacitance effects that have nothing to do with the microvalve response time. Faster responses of the microvalve occur when V1 is floated and V2 is applied. However, this test demonstrates the robustness of the design and the versatility of the microvalve under different operating conditions.

There are several factors to affect the switching time of the microvalve—impedance between two electrodes, the injector pressure, flow rate, and so on. Most of these factors are coupled with each other, which makes the optimal design of the microvalve complex. Capacitances between the electrodes are important since the membrane movement of the microvalve is corresponding to the capacitance variance, which should be as fast as possible.

Figure 4A:
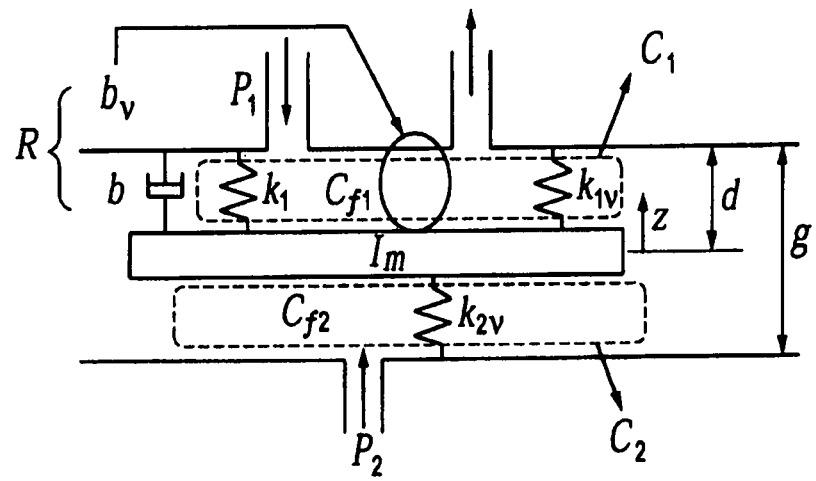
FIGS. 4A and 4B show an equivalent mechanical model and a bond graph modeling of an experimental fabricated microvalve.
Figure 4B:
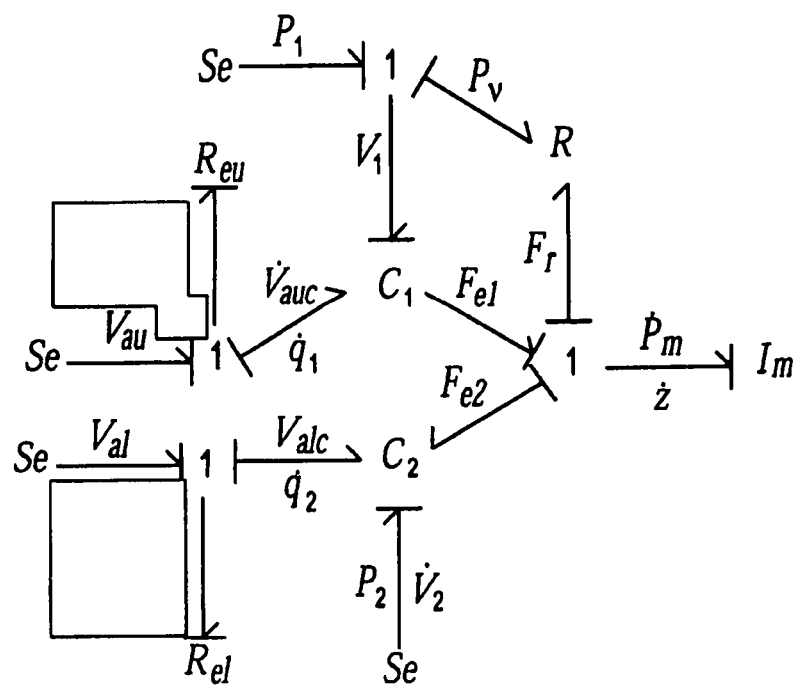

FIGS. 4A and 4B show an equivalent mechanical model and a bond graph modeling of the fabricated microvalve, respectively. The membrane movement can be modeled with a mass, $I_m$, a coupled $C_1$ which is composed of a mechanical spring, $k_1$, variable spring, $k_{1v}$, controlled by the voltage potential, $V_1$, fluidic capacitance, $C_{f1}$ and the other coupled $C_2$ which is composed of a variable spring, $k_{2v}$, controlled by the voltage potential, $V_2$, fluidic capacitance, $C_{f2}$, and damper, R, which is composed of a mechanical damper, b, fluidic damper, $b_v$. The voltage, $V_{au}$ and $V_{a1}$ are applied to $C_1$ and $C_2$. The pressures $P_1$ and/or $P_2$ can be applied to A and B, respectively. The terms of $R_{eu}$ and $R_{e1}$ represent the electrical resistances connected to $C_1$ and $C_2$, respectively. The terms of $F_{e1}$ and $F_{e2}$ represent the electrostatic force by $C_1$ and $C_2$, respectively. The terms, $V_{auc}$ and $V_{alc}$ represent the net potential applied to $C_1$ and $C_2$, respectively. The terms of $V_1$, and $V_2$ represent the volumes of the fluidic capacitance of $C_1$ and $C_2$, respectively. The term of $P_v$ represents the pressure drop made by the orifice B. The term of $F_r$ is the damping force which is proportional to z, derivative of the displacement of the membrane. The momentum of the membrane is denoted as $p_m$.

The constitutive equations for $V_{auc}(V_{alc})$, $F_{e1}(F_{e2})$, $P_1(P_2)$ are $$V_{auc} = \frac{q_1}{C_1},\ V_{alc} = \frac{q_2}{C_2} \tag{1}$$

$$F_{e1} = -\frac{1}{2}\frac{q_1^2}{\varepsilon A_1},\ F_{e2} = \frac{1}{2}\frac{q_2^2}{\varepsilon A_2} + k_1 z \tag{2}$$

$$P_1 = \frac{V_1}{C_{f1}},\ P_2 = \frac{V_2}{C_{f2}} \tag{3}$$

where $$C_1 = \frac{\varepsilon A_1}{(d-z)},\ C_2 = \frac{\varepsilon A_2}{(g-d+z)},$$

$\in$ is the electrical permittivity of $C_1$, $C_2$ and $A_1$, $A_2$ are the effective areas of the capacitance $C_1$ and $C_2$, respectively, and where $C_{f1}=f(C_1)$, $C_{f2}=f(C_2)$, the functions of $C_1$ and $C_2$, respectively.

The state equations are as follows, $$\dot{q}_1 = \dot{C}_1 V_{auc} + C_1 \dot{V}_{auc} \tag{4}$$

$$\dot{q}_2 = \dot{C}_2 V_{alc} + C_2 \dot{V}_{alc} \tag{5}$$

$$\dot{V}_1 = \dot{C}_{f1} P_1 + C_{f1} \dot{P}_1 \tag{6}$$

$$\dot{V}_2 = \dot{C}_{f2} P_2 + C_{f2} \dot{P}_2 \tag{7}$$

$$\dot{z} = \frac{p_m}{I_m} \tag{8}$$

$$\dot{p}_m = F_{e1} - F_{e2} - F_r \tag{9}$$

From Eqns. (4) and (5), if $V_{au}$ and $V_{alc}$ are switched much faster than the variance of $C_1$ and $C_2$, the second terms can be neglected since the first terms dominate dynamics of the flowing currents ($\dot{q}_1, \dot{q}_2$). Then, the switching time of the microvalve can be obtained from ($\dot{q}_1, \dot{q}_2$). However, it is not certain that the microvalve is operated from the fully opened position to the closed position, only with the information of the currents. From Eqns. (6) and (7), the switching time of the microvalve can be reflected on volume flow rates ($\dot{V}_1, \dot{V}_2$). However, to switch $P_1$ and $P_2$ faster than the variance of $C_{f1}$ and $C_{f2}$ is much more difficult to achieve than to switch $V_{auc}$ and $V_{alc}$ faster than the variance of $C_1$ and $C_2$. The second terms of Eqns. (6) and (7) cannot be neglected. Furthermore, most flow rate sensor has band-limited output (<100 Hz generally) due to its fluidic capacitance. Hence, the actual switching time cannot be obtained from the flow rates in most cases.

The common parameters in Eqns. (4), (5) and (6), (7) to affect the switching speed are capacitance variances, $C_1$ and $C_2$ which should be maximized to achieve the highest switching speed. The capacitance variances can be measured to obtain the switching speed of the microvalve. If the capacitance values are known when the microvalve is fully opened and closed, and measured dynamically with no band-limitation, the switching time of the microvalve can be obtained with much less error than the errors from the methods stated as above.

Figure 5A:
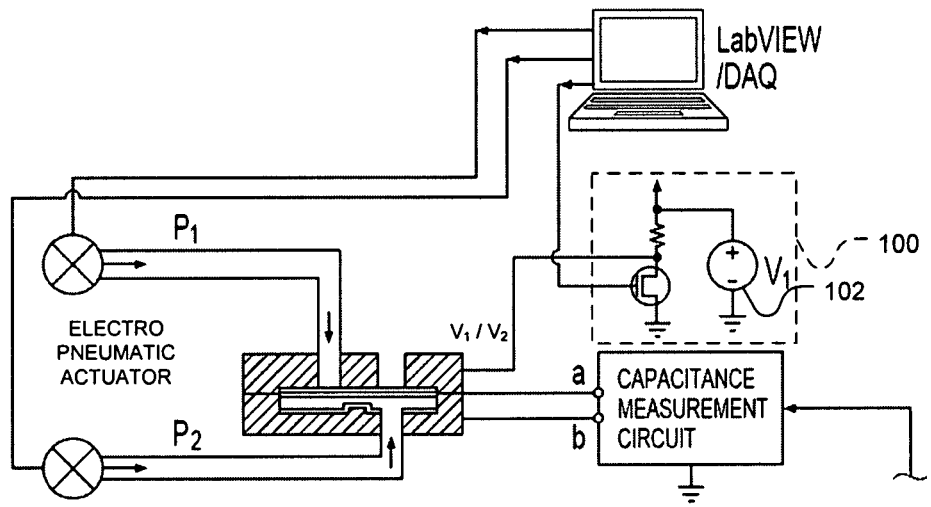
FIGS. 5A, 5B, and 5C show a test set up to measure capacitance variance to determine switching speed of an experimental fabricated microvalve.
Figure 5B:
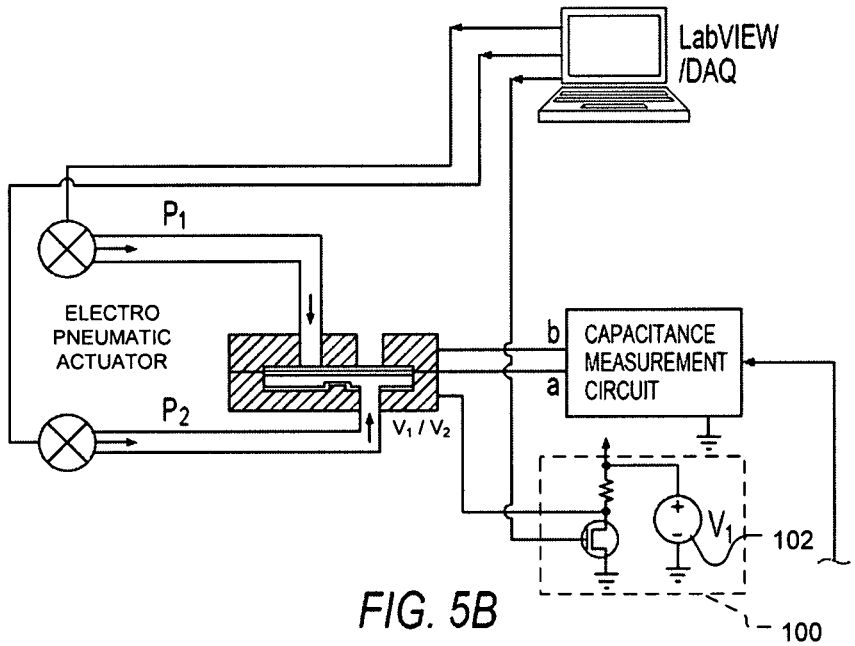
Figure 5C:
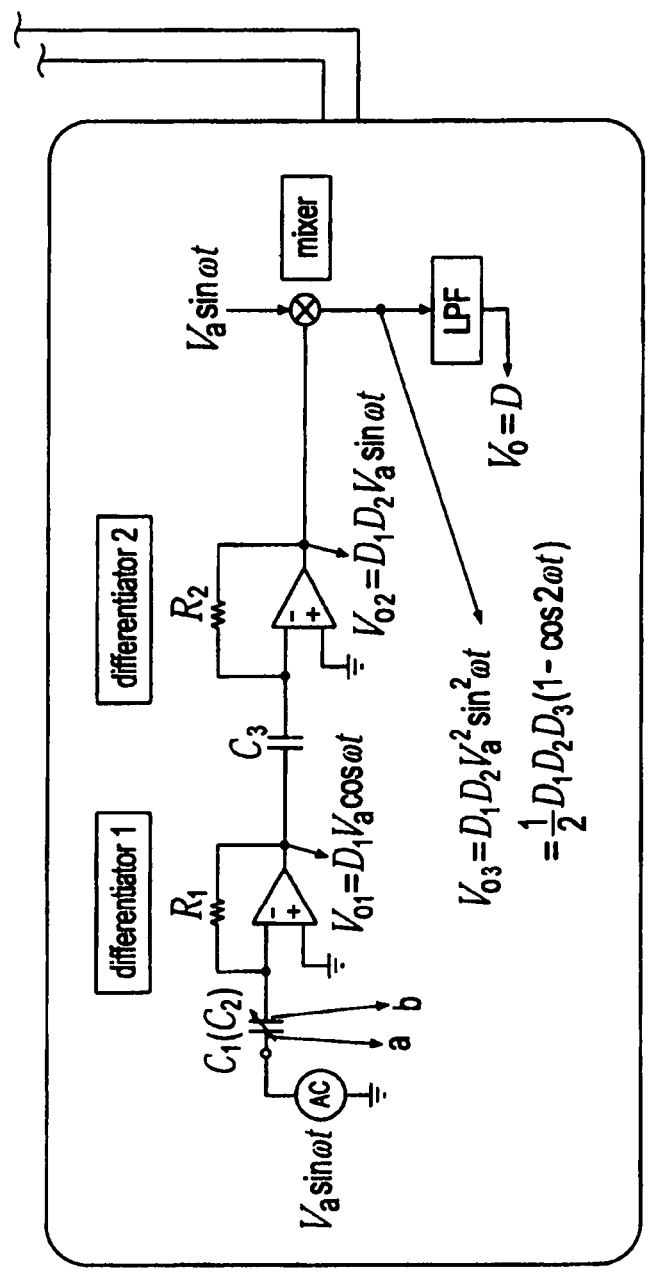

FIGS. 5A, 5B, and 5C illustrate a schematic diagram of an experimental setup for measuring the capacitance variance to find the switching speed of the microvalve. FIG. 5A shows an experimental setup for measuring the capacitance, $C_2$, between the membrane electrode and the lower fixed electrode. The membrane electrode is attracted to the upper electrode by applying the voltage potential ($V_1$) between them. The membrane electrode is attracted to the lower electrode by applying the voltage potential ($V_2$) between them. The generation of the voltages ($V_1$) and ($V_2$) may be through any known common varying voltage generation circuit such as circuit 100 that includes a voltage source 102 supplying voltage ($V_1$) along with a transistor and resistor combination configured to produce voltage ($V_1$) or ($V_2$) in response to an input signal. Of course, any known circuit may be used to generate two or more different voltages. In order to connect electrical wires and fluidic connections, the fabricated device may be encased in a package made by a stereolithography activated (SLA) polymer fabrication process, which may be electrical connections and fluidic holes. Two electro-pneumatic actuators are used to apply the pressures above the membrane and/or below the membrane to implement net pressure across the membrane. High speed MOSFETs (ST Microelectronics) are employed to control the on/off of the applied voltage to the electrodes without delays longer than 1 μs. All equipments mentioned above are connected to data acquisition board (DAQ, LabVIEW) that applies the voltage and measures the sensing voltage. FIG. 5B shows another arrangement of the experimental setup shown in FIG. 5A with the application of voltage ($V_1$) and ($V_2$) and the capacitance measurements attached at different physical locations to the microvalve. Of course other arrangements are within the spirit and scope of the invention.

There are some methods that measure capacitance variances such as using relaxation oscillator circuits, switched capacitors, and AC measurements. An amplitude modulation method was used in these experiments. FIG. 5C shows the circuit diagram of this method whose placement is shown in FIG. 5A. The capacitance to voltage conversion is performed by the following procedures. First, the reference sinusoidal signal is applied to the capacitor, $C_s(s=1,2)$, which is one part of the differentiator 1 with the resistor, $R_1$, which can be described by Eqn. (10). If a signal of $V_a^{\sin \omega t}$ is applied as a reference input where $V_a$ and $\omega$ are the amplitude and frequency of the signal, the 90° delayed output signal is represented by Eqn. (11) where $V_{o1}$ is the output of the differentiator 1 with its gain expressed as $D_1$. The output signal, $V_{o1}$, is differentiated again through the differentiator 2 to make 180° delayed signal from the reference signal. The second output signal, $V_{o2}$, is represented as Eqn. (12) with its gain of $D_1 D_2$.

$$C_S \left( \frac{dV_a}{dt} \right) = -\frac{V_{o1}}{R_1} \quad (10)$$

$$V_{o1} = -\omega R_1 C_S V_a \cos \omega t = -D_1 V_a \cos \omega t \quad (11)$$

$$V_{o2} = \omega^2 R_1 R_2 C_S C_3 V_a \sin \omega t = D_1 D_2 V_a \sin \omega t \quad (12)$$

$$V_{o3} = D_1 D_2 V_a^2 \sin^2 \omega t = D_1 D_2 D_3 \frac{1}{2}(1 - \cos 2\omega t) \quad (13)$$

$$V_o = D \quad (14)$$

The 180° delayed signal and the reference signal are multiplied using a mixer (AD633, Analog device). This signal output, $V_{30}$ represented Eqn. (13) passes through a low pass filter (LPF) and finally only DC output, D, can be obtained which is proportional to the capacitance value.

Figure 6A:
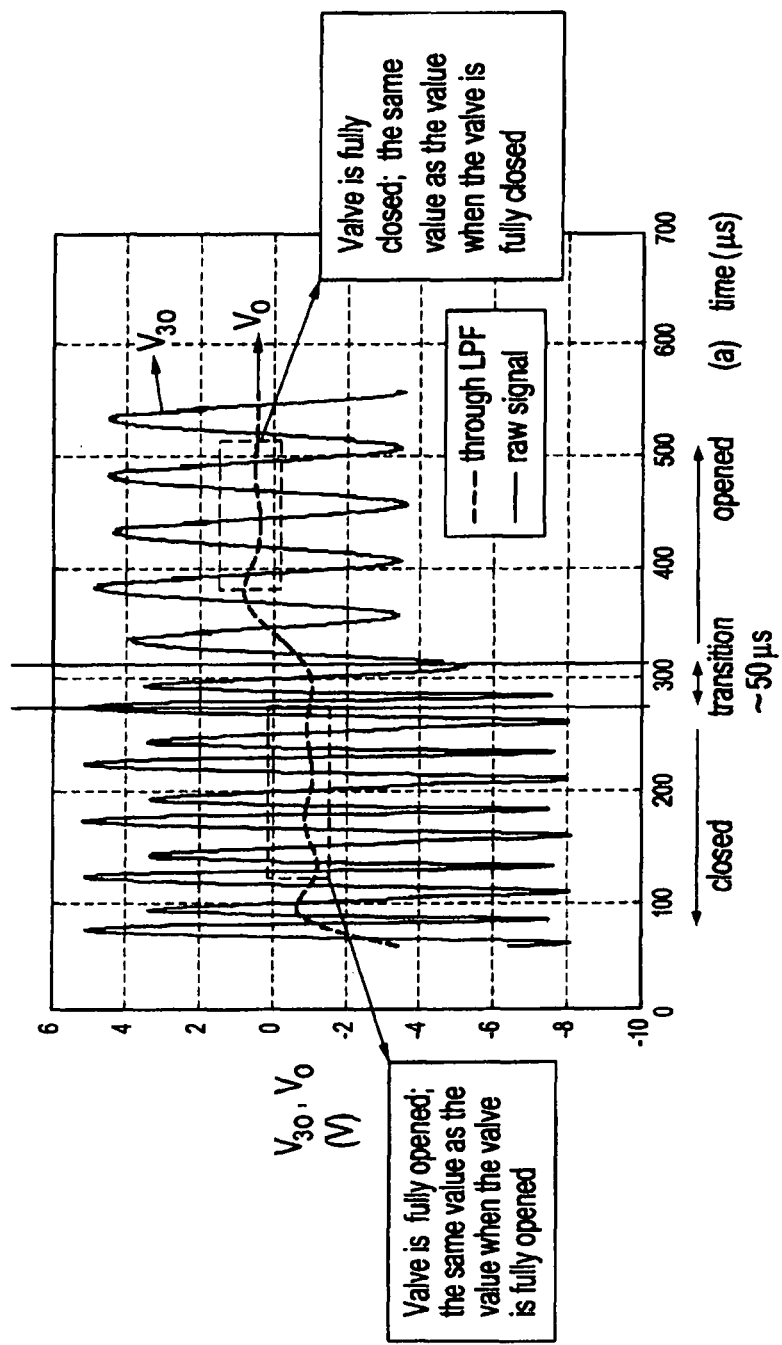
Figure 6B:
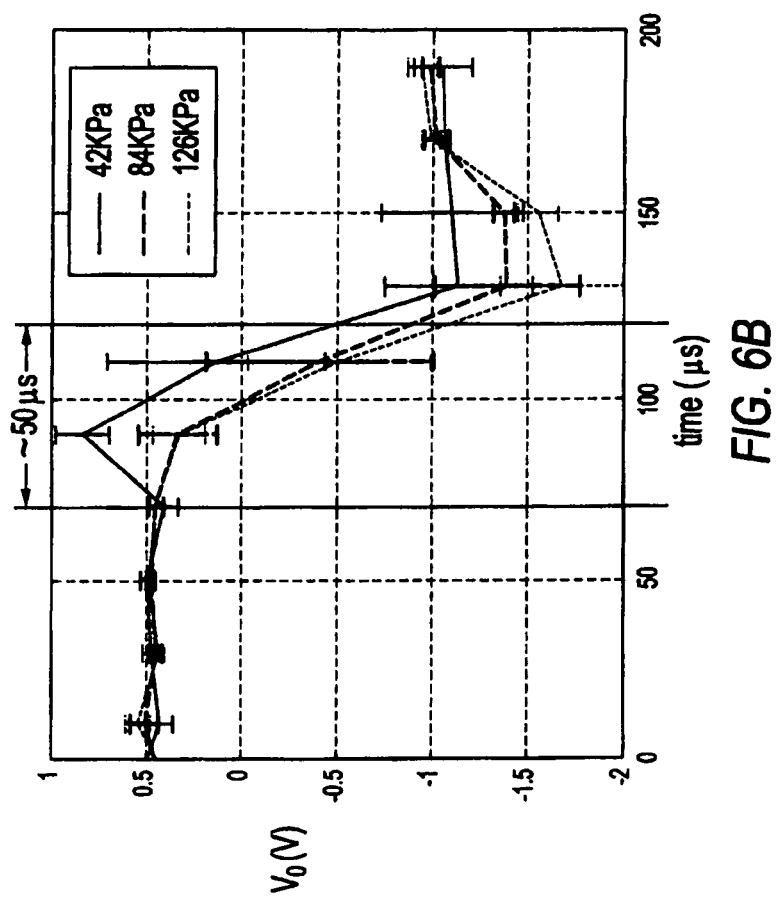

FIG. 6A shows $V_{30}$ (solid line) and $V_0$ (dotted line) when $C_2$ is measured while the microvalve is closed using the setup shown in FIG. 5A. The cut-off frequency of the LPF is 30 KHz which is low enough to filter the sinusoidal component of Eqn. (13), but high enough to pass the variation of DC component, D, where $\omega$ is $2\pi 20$ KHz, $V_a$=10V, and $V_1$=140V. Each DC value before and after the variation is corresponding to the fully opened and closed state of the microvalve. The switching time is the same as the transition time from the opened to the closed state, and is shown in FIG. 6A to be 50 μs. FIGS. 6B and 6C show $V_0$ corresponding to $C_2$ when the microvalve is opened and closed with the pressure, $P_1$ at 42, 84, 126 KPa, respectively. All the experiments are performed five times to take the average and standard deviation which are shown in FIGS. 6B and 6C. The pressure, $P_1$, is applied against the electrostatic force between the microvalve closing electrode and the imbedded electrode. When the microvalve is opened, all the switching times are fairly close to 50 μs even though they appear to decrease slightly since $P_1$ is applied for the membrane to move towards the lower electrode. When the microvalve is closed, the switching time starts at 30 μs, but increases to 50 μs as $P_1$ increases since $P_1$ is applied against the microvalve to close.

Figure 7A:
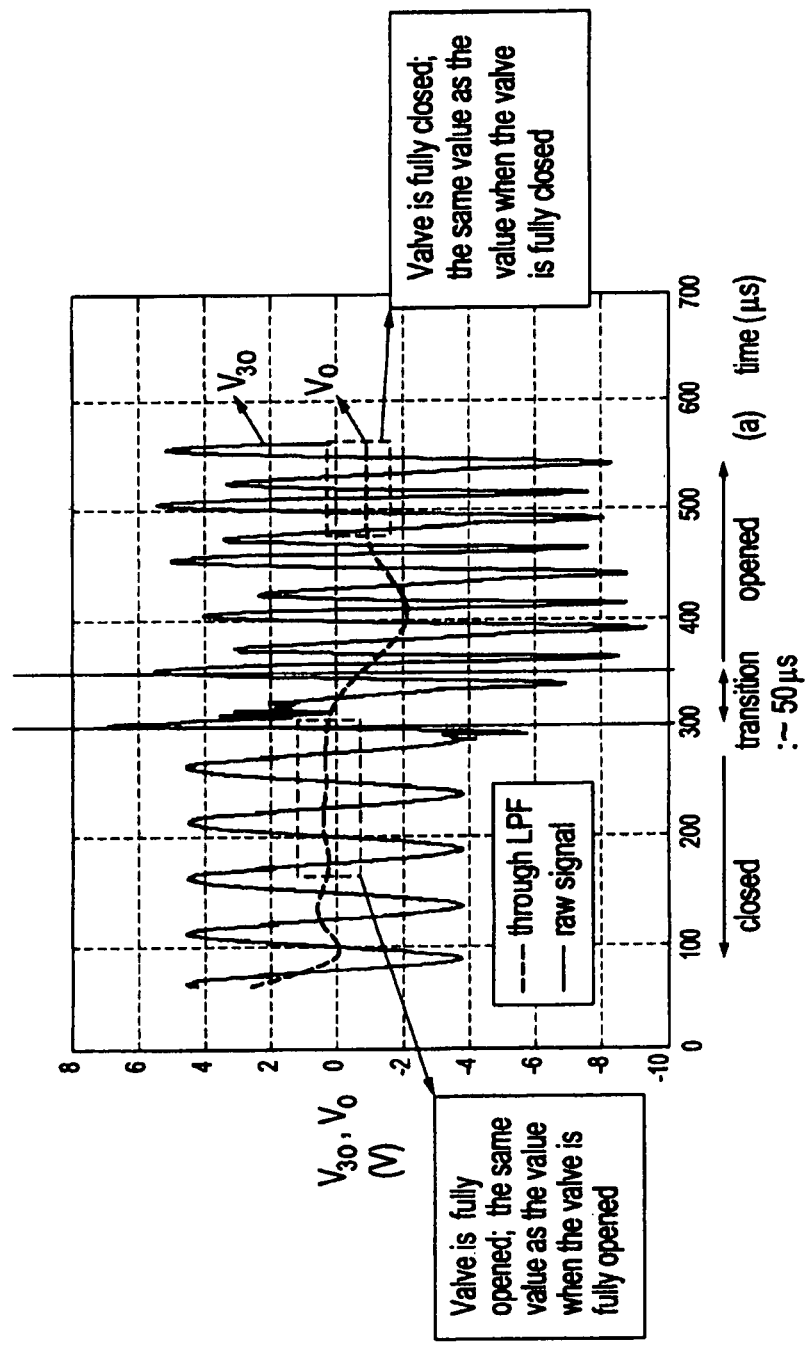
FIGS. 7A, 7B, and 7C show measured response times when the microvalve is closed in the test set up of FIG. 5B.
Figure 7B:
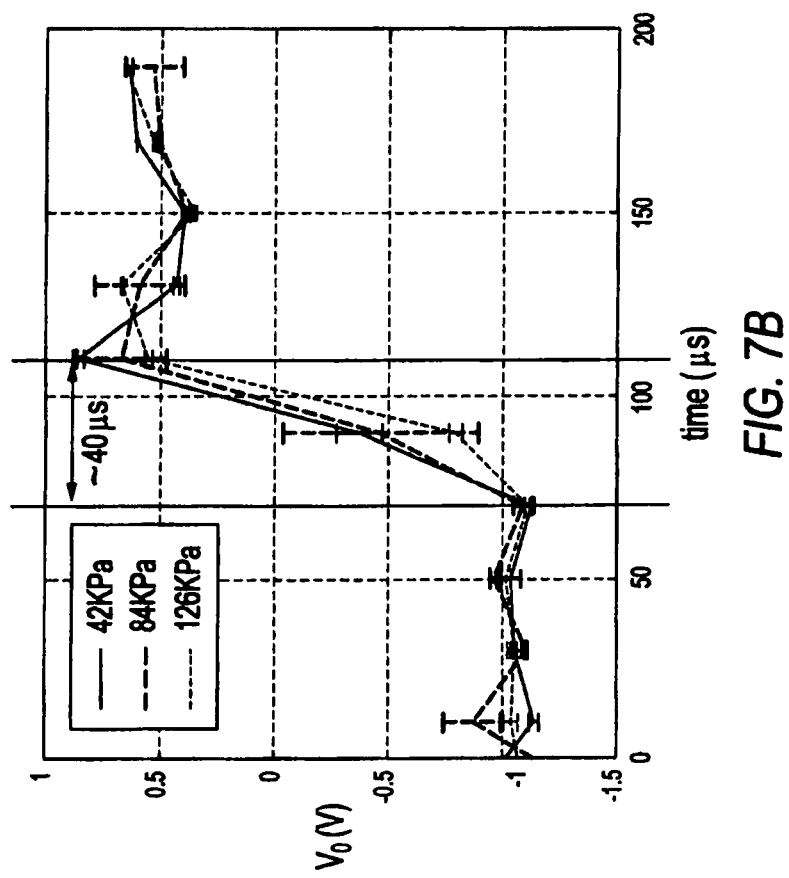
Figure 7C:
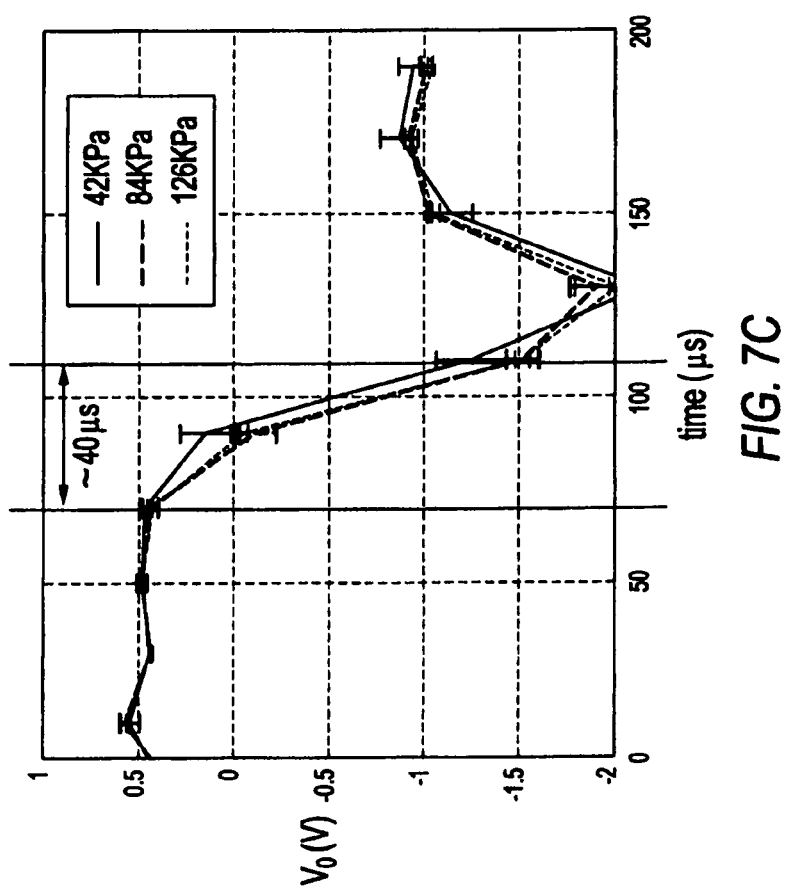

FIG. 7A shows $V_{30}$ (solid line) and $V_0$ (dotted line) when $C_1$ is measured while the microvalve is closed using the setup shown in FIG. 5B, where other conditions are the same as the conditions explained in FIG. 5A. FIG. 7B and (c) show $V_0$ corresponding to $C_1$ when the microvalve is opened and closed where other conditions are the same as the conditions explained in FIGS. 5B, 5C, except that $P_2$ is applied instead of $P_1$. The pressure, $P_2$, is applied against the electrostatic force between the membrane electrode and the lower electrode. When the microvalve is opened, all switching times are fairly close to 40 μs even though they appear to increase slightly as $P_2$ increases since $P_2$ is applied against the microvalve to open. When the microvalve is closed, the switching times are fairly close to 40 μs even though they appear to decrease slightly as $P_2$ increases since $P_2$ is applied for the membrane to move towards the microvalve closing electrode. All overshoots in the transition in FIGS. 6 and 7 come from the inertia effect of the membrane mass.

Figure 8:
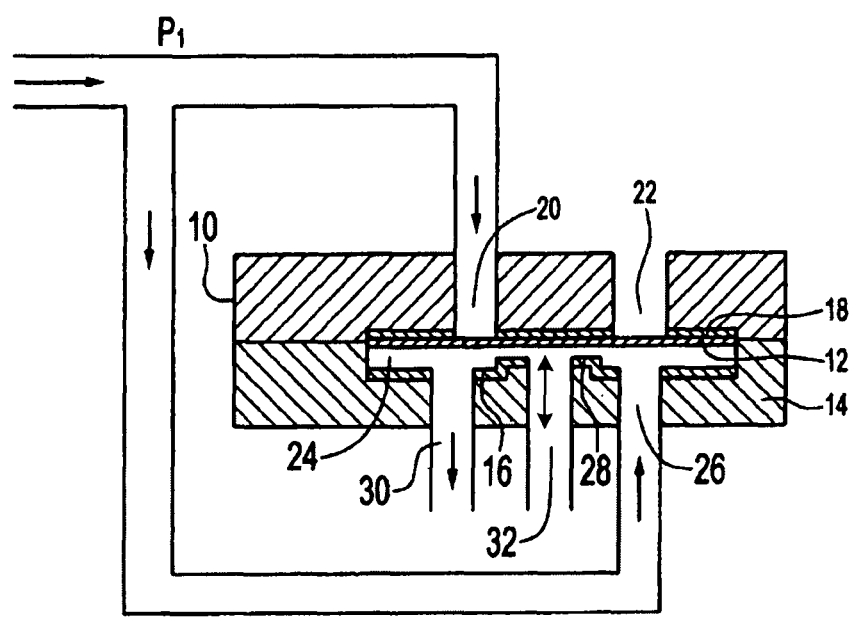
FIG. 8 is a cross-sectional schematic view of a preferred electrostatically actuated dual complementary microvalve embodiment.

FIG. 8 shows another preferred embodiment microvalve. The FIG. 8 embodiment is similar to FIGS. 1A-1C, and like parts of the FIG. 8 microvalve are labeled with the reference numbers from FIG. 1A-C. In the FIG. 8 device, the central pad 28 includes an outlet 30 and port 32. Alternatively, the central pad 28 can include either an inlet or outlet, and the pressure balance port 26 can serve as the other of the inlet or outlet. In the FIG. 8 embodiment, complementary operating microvalves are thereby defined in the upper fixed electrode 10 (microvalve 1, including inlet 20 and outlet 22) and the lower fixed electrode 12 (microvalve 2, including inlet 26 and outlet 30). When microvalve 1 opens, microvalve 2 closes, and vice versa.

In the FIG. 8 embodiment, the port 32 may be structured to operate in a normally open position such that it fails in the open position. With this configuration, the flow may then normally be from port 32 to outlet 30. Moreover, the membrane electrode may move to the bottom to close the port 32. In this configuration, the port 26 may not be used and ports 20, 22 may serve as a pressure balance to port 32.

Figure 9A:
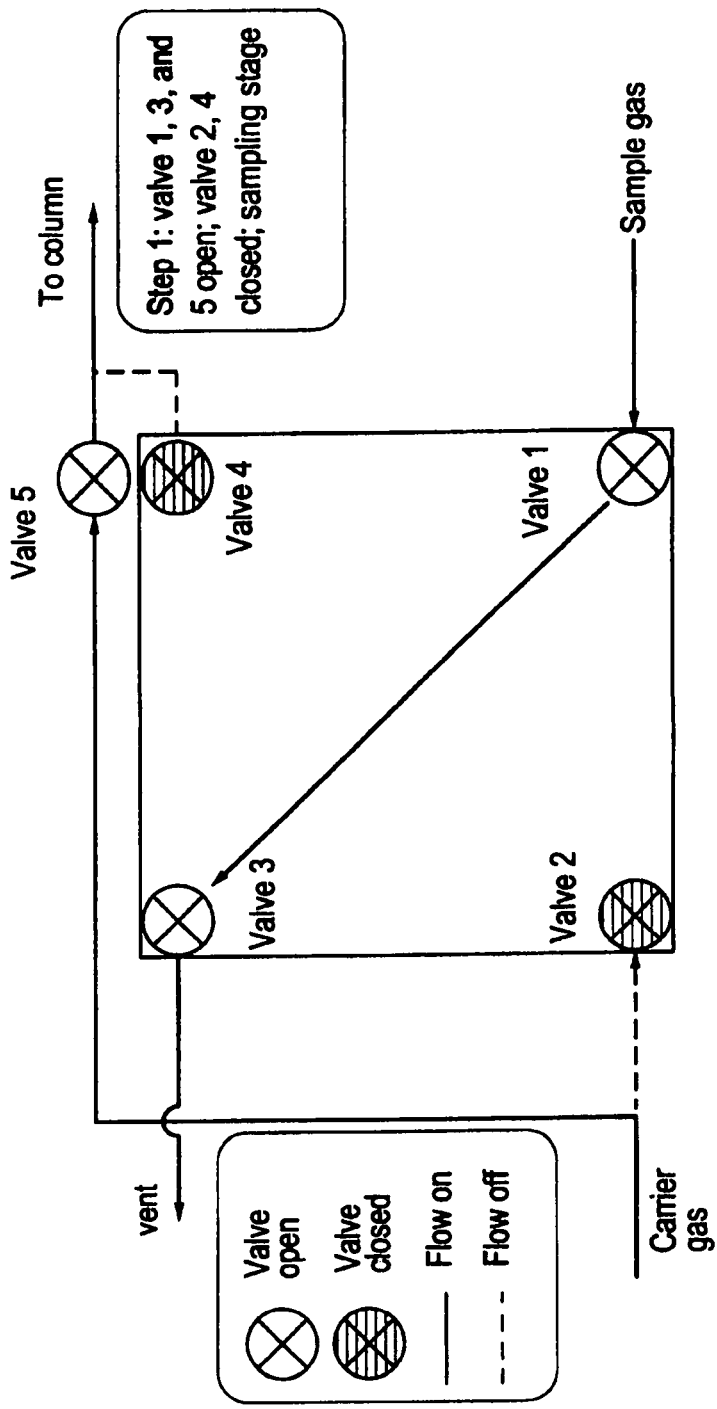
FIG. 9A is a block diagram indicating flows of a preferred five valve microvalve embodiment for injection of a sample gas into a chromotagraphy device.
Figure 9B:
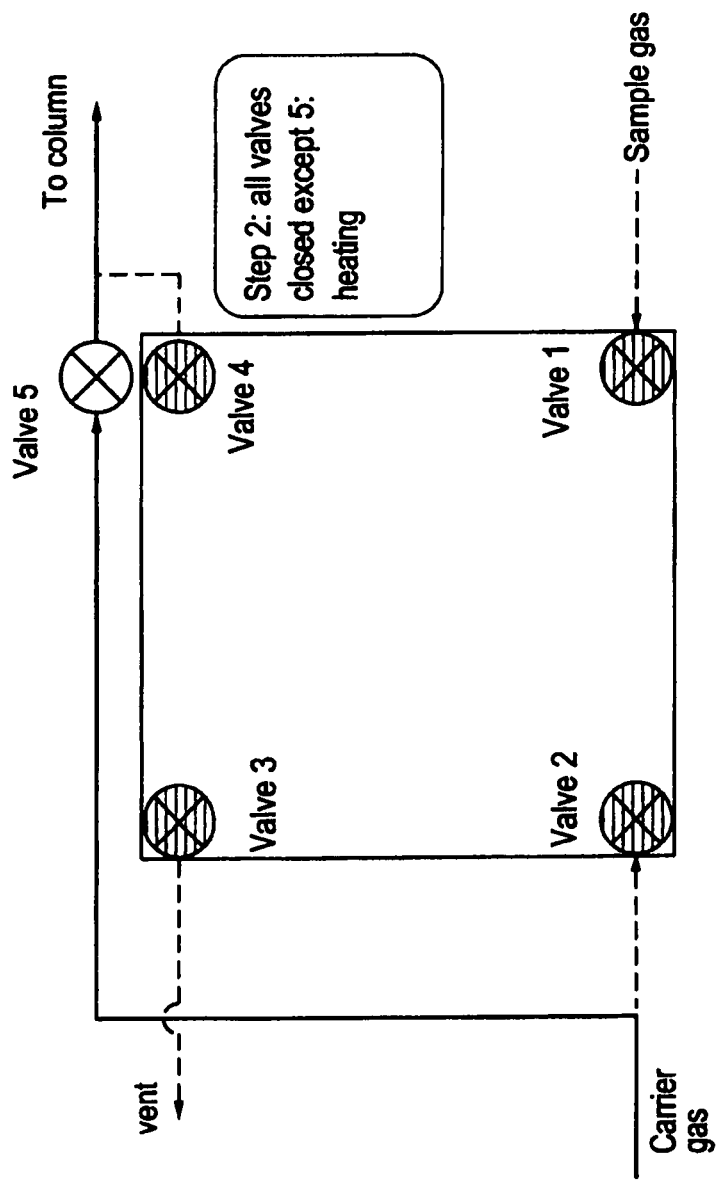
FIG. 9B is a block diagram indicating flows of the preferred five valve microvalve embodiment in a sample heating state.
Figure 9C:
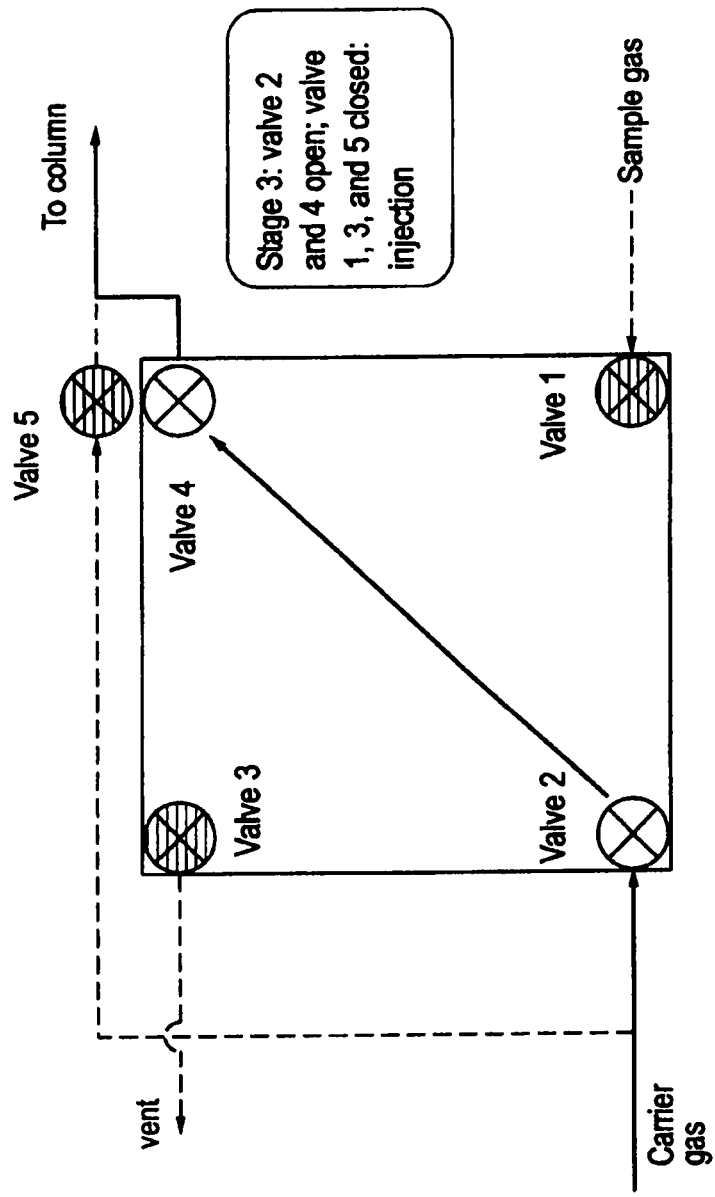
FIG. 9C is a block diagram indicating flows of the preferred five valve microvalve embodiment in a sample injection state.
Figure 9D:
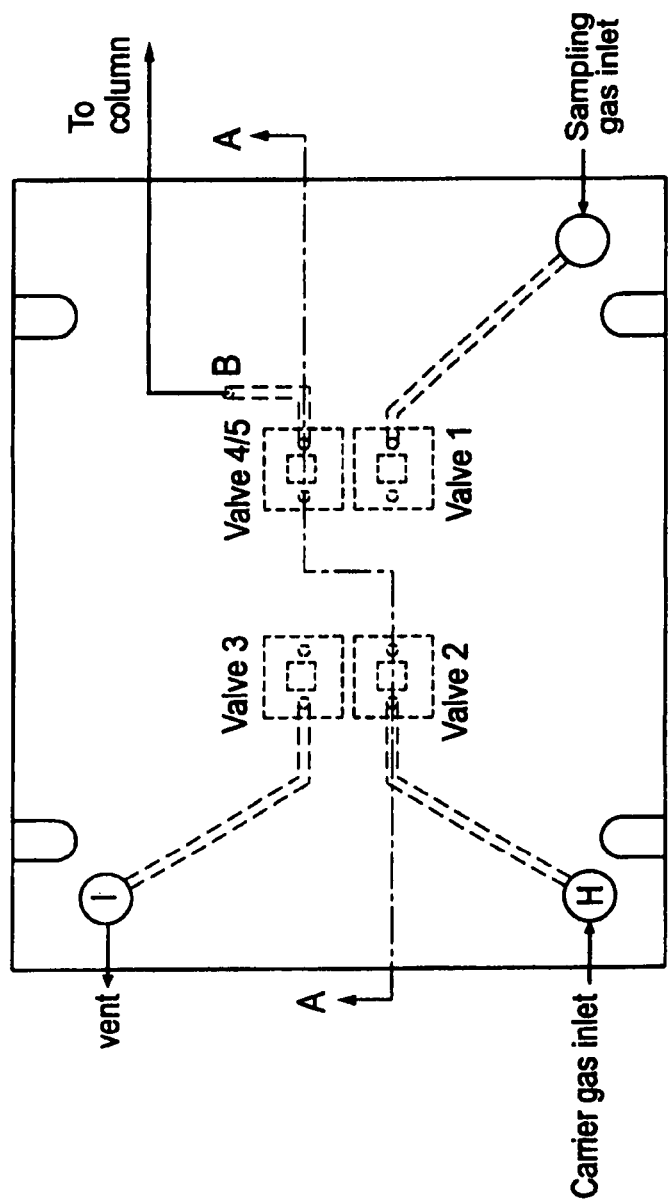
FIG. 9D is a schematic top view of an upper fixed electrode of the preferred five valve microvalve embodiment.
Figure 9E:
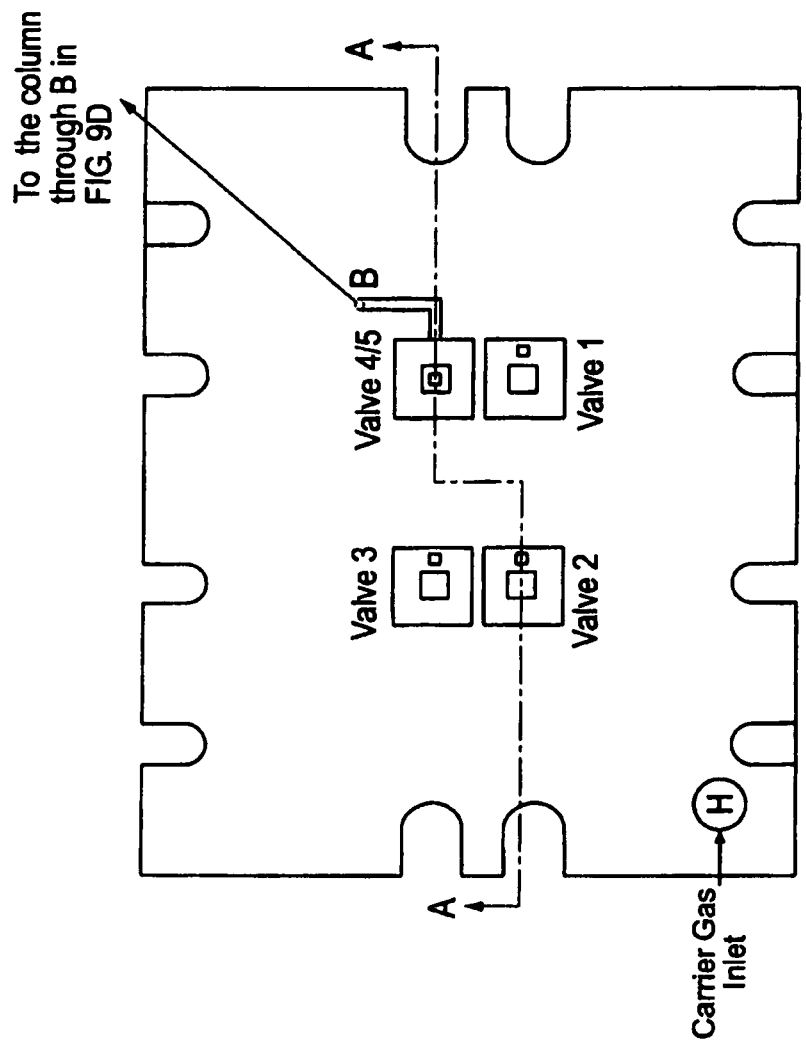
FIG. 9E is a schematic top view of a lower fixed electrode of the preferred five valve microvalve embodiment.

FIGS. 9A-9G illustrate a preferred embodiment five valve microvalve, with states indicated for sampling, heating and injection into a chromatography device. In FIGS. 9A-9C, flows are indicated for respective sampling, heating, and injection states. FIGS. 9D and 9E respectively show the valve opening and microchannel positions for the upper and lower fixed electrodes. FIGS. 9F and 9G show different positions of the membrane electrode 12. Similar parts are labeled with the reference numbers used in FIGS. 1A-1C and 8.

As seen in FIGS. 9F and 9G, the microvalve includes an additional chamber 36 to direct flow between microchannels valves. The microvalve is symmetrical about a post 38 that separates two separate microcavities 24. Operation on the left and right sides of the microvalve can be independent or can be synchronized, as the membrane 12 could have multiple metal patterns. In FIG. 9F, valve 2, valve 3 and valve 4 are closed (valve 5 is open). In FIG. 9G, the membrane 12 is fully open into both of the left and right microcavities 24 and in contact with the central pads 28. Flows are indicated as in FIGS. 9A-9F. Different flow paths and bi-direction configurations can be made by moving the location of the inlet and outlet ports and center pad as needed.

While specific embodiments of the present invention have been shown and described, it should be understood that other modifications, substitutions and alternatives are apparent to one of ordinary skill in the art. Such modifications, substitutions and alternatives can be made without departing from the spirit and scope of the invention, which should be determined from the appended claims.

Various features of the invention are set forth in the appended claims.

The invention claimed is:

1. An electrostatically actuated microvalve, comprising:
    a first electrode insulated with dielectric and defining a fluid inlet and outlet;
    a second electrode insulated with dielectric;
    a microcavity defined by at least one of said first and second electrodes;
    a membrane electrode insulated with dielectric and held between said first and second electrodes, said membrane electrode being deformable by application of voltage to one or both of said first and second electrodes to control fluid flow between said fluid inlet and outlet;
    a central pad defined in said second electrode, said central pad being disposed closer to said membrane electrode than said microcavity when said membrane electrode is against said first electrode; and
    wherein the surfaces of said first and second electrodes are generally flat and said membrane electrode is generally flat when said membrane electrode is disposed against said first electrode such that actuation occurs without rolling action by displacing said membrane electrode against said central pad to open said microvalve and permit communication between said fluid inlet and outlet.

2. The microvalve of claim 1, wherein said central pad is approximately 10 microns from said membrane electrode when said membrane electrode is against said first electrode.

3. The microvalve of claim 2, wherein said microcavity is 150 microns or less from said membrane electrode when said membrane electrode is against said first electrode.

4. The microvalve of claim 3, wherein said microcavity is 25 microns or less from said membrane electrode when said membrane electrode is against said first electrode.

5. The microvalve of claim 1, wherein said microcavity is 150 microns or less from said membrane electrode when said membrane electrode is against said first electrode.

6. The microvalve of claim 5, wherein said microcavity is 25 microns or less from said membrane electrode when said membrane electrode is against said first electrode.

7. The microvalve of claim 1, further comprising a pressure balance port in said second electrode to provide fluid pressure into said microcavity and against said membrane electrode in opposition to fluid pressure from said fluid inlet.

8. The microvalve of claim 7, further comprising an additional pressure balance port in said second electrode to accept fluid flow out of said microcavity.

9. The microvalve of claim 1, wherein said membrane electrode comprises vacuum cured polyimide over a patterned metal layer.

10. The microvalve of claim 1, wherein the dielectric of at least one of said first electrode and said second electrode includes a polymeric or fluorinated low surface energy film coating.

11. The microvalve of claim 10, further comprising a low surface charge trapping film coating on the dielectric of at least one of said first, second, and membrane electrodes.

12. The microvalve of claim 10, wherein said polymeric or fluorinated low surface energy film coating comprises a fluorocarbon film made from cross-linked carbon di-fluoride monomers and said low surface charge trapping film coating comprises a nitride dielectric film.

13. The microvalve of claim 11, wherein said polymeric or fluorinated low surface energy film coating comprises surface monolayers made from fluorocarbon terminated silanol compounds and said low surface charge trapping film coating comprises a nitride dielectric.

14. The microvalve of claim 13, wherein said dielectric of said at least one of said first, second, and membrane electrodes comprises silicon oxide and said polymeric or fluorinated low surface energy film coating comprises one of $CF_x$ and heptadecafluoro-1,1,2,2-tetrahydrodecyl groups and said low surface charge trapping film coating comprises silicon nitride.

15. The microvalve of claim 11, wherein said dielectric of said at least one of said first, second, and membrane electrodes comprises silicon oxide and said polymeric or fluorinated low surface energy film coating comprises a fluorinated hydrocarbon and said low surface charge trapping film coating comprises silicon nitride.

16. The microvalve of claim 11, wherein the total thickness of said dielectric, said polymeric or fluorinated low surface energy film coating, and said low surface charge trapping film coating on each of said first, second and membrane electrodes is between 0.1 and 20 microns thick.

17. The microvalve of claim 1 wherein said dielectric on each of said first, second and membrane electrodes is between 0.1 and 20 microns thick.

18. The microvalve of claim 17, wherein said dielectric on each of said first, second and membrane electrodes is between 1 and 3 microns thick.

19. The microvalve of claim 1, further comprising:
    an additional inlet and outlet in said second electrode, at least one of said inlet and outlet being formed in said central pad.

20. The microvalve of claim 1, wherein said first and second electrodes comprise semiconductor materials including a semiconductor and its oxide or nitride dielectric, and said membrane electrode comprises a metal layer within a dielectric polymer.

21. The microvalve of claim 20, wherein said metal layer comprises a Cr/Au/Cr metal layer and said dielectric polymer comprises one of polyimide, paralene, fluoropolymers, polyester, polybutylene, and polydimethylsiloxane.

22. The microvalve of claim 20, wherein said membrane electrode is no more than 20 microns thick.

23. The microvalve of claim 20, wherein said dielectric polymer comprises a polymer cured in a less than atmospheric pressure environment absent any water vapor.

24. The microvalve of claim 23, wherein said dielectric polymer comprises a polymer cured at a temperature range between about 350° C. and 450° C.

25. The microvalve of claim 1, wherein dielectric layers on one or more of said first and second electrodes, and said membrane electrode comprise an oxide layer coated with a few monolayers or less of a nitride.

26. The microvalve of claim 1, wherein:
    said first electrode and said second electrode each comprise a structural material layer covered with a low bulk charge dielectric layer, and a low surface charge dielectric and a low surface energy multi-layer; and
    said membrane electrode comprises a metal layer covered on both sides with a structural dielectric layer having low bulk charge trapping, and a low surface charge dielectric and a low surface energy multi-layer.

27. The microvalve of claim 1, wherein:
    said first electrode and said second electrode each comprise a structural material layer covered with a low bulk charge dielectric layer, and a low surface charge dielectric and a low surface energy multi-layer; and
    said membrane electrode comprises a structural dielectric layer covered on both sides with a metal layer, a low bulk charge trapping dielectric layer, and a low surface charge dielectric and a low surface energy multi-layer.

28. The microvalve of claim 1, wherein said first electrode, said second electrode, and said membrane electrode are bonded together with adhesive.

29. The microvalve of claim 28, wherein said adhesive comprises an epoxy adhesive.

30. The microvalve of claim 28, wherein said adhesive has a thickness of less than about 20 microns.

31. The microvalve of claim 30, wherein said adhesive has a thickness in the range of about 0.1 to 3 microns.

32. The microvalve of claim 31, wherein said adhesive has a thickness in the range of about 0.2 to 0.4 microns.

33. The microvalve of claim 28, wherein said adhesive is applied by contact printing.

34. The microvalve of claim 1, wherein said central pad includes an outlet and a port.

35. The microvalve of claim 1, wherein said central pad includes either an outlet or an inlet.

36. The microvalve of claim 34, wherein said port is configured for operation with two-way valves.

37. An electrostatically actuated microvalve, comprising:
a flexible movable membrane that contains an imbedded electrode;
a microvalve closing electrode including transverse fluid ports against which the membrane seats and seals; and
a fixed opening electrode to provide an opening force to attract said membrane away from said microvalve closing electrode to allow fluid flow between said transverse ports, said fixed opening electrode and said microvalve closing electrode defining a microcavity having opposed, generally flat surfaces and a central pad permitting the membrane to deform sufficiently into the microcavity without rolling against the surface of said microcavity in intermediate positions between opening and closing to permit a predetermined amount of fluid flow, said central pad and said microvalve closing electrode providing touch-mode capacitance actuation without rolling action in intermediate positions between opening and closing of the microvalve.

38. The microvalve of claim 1, wherein the switching time of said microvalve is 50 microseconds or less.

39. The microvalve of claim 1, wherein said membrane electrode deforms without rolling against the surface of said microcavity in intermediate positions between opening and closing the microvalve.

40. The microvalve of claim 1, wherein said membrane electrode includes at least one of a low charge trapping film and a low surface energy film.

41. The microvalve of claim 1, wherein said polymeric or fluorinated low surface energy film coating is selected from the group consisting of fluorocarbon film made from cross-linked carbon di-fluoride monomers, surface monolayers made from fluorocarbon terminated silanol compounds, $CF_x$ groups, heptadecafluoro-1,1,2,2-tetrahydrodecyl groups, and fluorinated hydrocarbons.

42. An electrostatically actuated microvalve, comprising:
a first electrode insulated with dielectric and defining a fluid inlet and outlet;
a second electrode insulated with dielectric;
a microcavity defined by at least one of said first and second electrodes and having a first generally constant height;
a membrane electrode insulated with dielectric and held between said first and second electrodes, said membrane electrode being deformable by application of voltage to one or both of said first and second electrodes to control fluid flow between said fluid inlet and outlet;
a central pad defined in said second electrode, said central pad protruding towards said first electrode such that the gap between said membrane electrode and said central pad is less than the height of the microcavity, and
said microvalve having a closed position defined by said membrane electrode being disposed against said first electrode, and an open position defined by said membrane electrode being displaced against said central pad without rolling action.

43. The microvalve of claim 1, further comprising a low surface charge trapping film coating on the dielectric of at least one of said first, second, and membrane electrodes.

44. The microvalve of claim 42, wherein the microcavity has a generally rectangular cross section.

* * * * *